(12) United States Patent
Jeong et al.

(10) Patent No.: US 12,213,259 B2
(45) Date of Patent: Jan. 28, 2025

(54) DISPLAY DEVICE

(71) Applicant: Samsung Display Co., LTD., Yongin-si (KR)

(72) Inventors: Jae Hoon Jeong, Bucheon-si (KR); Hansun Ryou, Seoul (KR); Heonjung Shin, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 116 days.

(21) Appl. No.: 17/213,819

(22) Filed: Mar. 26, 2021

(65) Prior Publication Data
US 2021/0410302 A1 Dec. 30, 2021

(30) Foreign Application Priority Data
Jun. 24, 2020 (KR) .................. 10-2020-0077169

(51) Int. Cl.
*H05K 5/00* (2006.01)
*B32B 3/16* (2006.01)
(Continued)

(52) U.S. Cl.
CPC ............. *H05K 5/0017* (2013.01); *B32B 3/16* (2013.01); *B32B 7/14* (2013.01);
(Continued)

(58) Field of Classification Search
CPC ... B32B 3/16; B32B 2255/26; B32B 2255/28; B32B 2264/2032; B32B 2266/0214; B32B 2307/51; B32B 7/14; B32B 5/18; B32B 5/20; B32B 15/046; B32B 27/065; B32B 2266/0221; B32B 2266/0242; B32B 2266/025; B32B 2266/0257; B32B 2266/0264; B32B 2266/0271; B32B 2266/0278; B32B 2266/0285;
(Continued)

(56) References Cited

U.S. PATENT DOCUMENTS

| 7,733,022 B2 | 6/2010 | Kim et al. |
| 10,191,516 B2 | 1/2019 | Jang et al. |

(Continued)

FOREIGN PATENT DOCUMENTS

| CN | 1641824 | 7/2005 |
| CN | 108264869 A * | 7/2018 |

(Continued)

OTHER PUBLICATIONS

Machine translation of CN 108264869 via EPO (Year: 2018).*
Machine translation of JP 2016-065196 via EPO (Year: 2016).*
Machine translation of WO 2019196736 via EPO (Year: 2019).*

*Primary Examiner* — Ian A Rummel
*Assistant Examiner* — Rebecca L Grusby
(74) *Attorney, Agent, or Firm* — KILE PARK REED & HOUTTEMAN PLLC

(57) ABSTRACT

A display device includes a display module including a first non-folding area, a folding area, and a second non-folding area, a support plate disposed below the display module, a foam coating layer including a base portion and a foaming agent included in the base portion, the foam coating layer being disposed directly on the support plate; and a barrier layer disposed between the display module and the foam coating layer and including an elastic material.

18 Claims, 14 Drawing Sheets

(51) Int. Cl.
*B32B 7/14* (2006.01)
*G02F 1/1333* (2006.01)
*H04M 1/02* (2006.01)

(52) U.S. Cl.
CPC .... *G02F 1/133305* (2013.01); *H04M 1/0268* (2013.01); *B32B 2255/26* (2013.01); *B32B 2255/28* (2013.01); *B32B 2264/2032* (2020.08); *B32B 2266/0214* (2013.01); *B32B 2307/51* (2013.01); *B32B 2457/20* (2013.01)

(58) Field of Classification Search
CPC ..... B32B 2266/0292; B32B 3/10; B32B 3/14; B32B 3/18; B32B 3/22; G02F 1/13305; G02F 1/1334; G06F 1/1616; G06F 1/1652; G06F 1/1681; G06F 1/1618; G06F 1/162; G09F 9/301; H04M 1/0216; H04M 1/0268; H04M 1/0269; H05K 5/0017; H10K 77/10; H10K 77/111
See application file for complete search history.

(56) References Cited

U.S. PATENT DOCUMENTS

| | | | |
|---|---|---|---|
| 10,966,328 B2 | 3/2021 | Choi et al. | |
| 2006/0087865 A1 | 4/2006 | Ha et al. | |
| 2016/0048169 A1* | 2/2016 | Yang | H04M 1/0268 361/749 |
| 2018/0013080 A1* | 1/2018 | Kim | H10K 59/8794 |
| 2018/0352664 A1 | 12/2018 | Park et al. | |
| 2019/0258342 A1* | 8/2019 | Han | G06F 3/044 |
| 2019/0361286 A1* | 11/2019 | Jang | G02F 1/133308 |
| 2020/0022267 A1 | 1/2020 | Han et al. | |
| 2020/0068725 A1* | 2/2020 | Park | H10K 50/84 |
| 2020/0119290 A1* | 4/2020 | Shin | H01L 51/5237 |
| 2020/0260596 A1* | 8/2020 | Park | B32B 7/022 |
| 2020/0344899 A1* | 10/2020 | Myung | H05K 5/0017 |
| 2021/0029837 A1* | 1/2021 | Kim | H05K 5/0217 |
| 2021/0041601 A1* | 2/2021 | Oh | B32B 27/08 |
| 2021/0104693 A1* | 4/2021 | Cho | B32B 27/40 |
| 2021/0109566 A1* | 4/2021 | Myeong | G06F 1/1616 |
| 2021/0141124 A1* | 5/2021 | Park | G09F 9/301 |
| 2021/0174711 A1* | 6/2021 | Cho | G06F 1/1652 |
| 2021/0193941 A1* | 6/2021 | Li | H01L 51/0097 |
| 2021/0202879 A1* | 7/2021 | Park | H01L 27/3244 |
| 2021/0265590 A1* | 8/2021 | Wang | H10K 50/8426 |
| 2021/0282279 A1* | 9/2021 | Min | B32B 27/281 |
| 2021/0373604 A1* | 12/2021 | Shin | G06F 1/1637 |
| 2022/0184920 A1* | 6/2022 | Jia | B32B 27/281 |
| 2022/0199922 A1* | 6/2022 | Choi | H10K 77/111 |
| 2023/0070431 A1* | 3/2023 | Li | G06F 1/1656 |
| 2023/0114378 A1* | 4/2023 | Han | G09F 9/301 361/679.27 |

FOREIGN PATENT DOCUMENTS

| | | |
|---|---|---|
| CN | 110503895 | 11/2019 |
| CN | 111312660 | 6/2020 |
| JP | 2000-206899 | 7/2000 |
| JP | 2016065196 A * | 4/2016 |
| KR | 10-2018-0062273 | 6/2018 |
| KR | 10-2018-0133287 | 12/2018 |
| KR | 10-2019-0081335 | 7/2019 |
| KR | 10-2020-0006646 | 1/2020 |
| WO | WO-2019196736 A1 * | 10/2019 |

* cited by examiner

DISPLAY DEVICE

CROSS-REFERENCE TO RELATED APPLICATION(S)

This application claims priority to and benefits of Korean Patent Application No. 10-2020-0077169 under 35 U.S.C. § 119, filed in the Korean Intellectual Property Office on Jun. 24, 2020, the entire contents of which are incorporated herein by reference.

BACKGROUND

1. Technical Field

The disclosure relates to a display device and to a foldable display device.

2. Description of the Related Art

A display device displays various images through a display screen to provide a user with information. The display device may be applied to various electronic items, such as a smartphone, a notebook computer, a television, etc., to display the images.

In recent years, flexible display devices including a flexible display panel that may be foldable are being developed. Different from a rigid display device, the flexible display device may be foldable, rollable, or bendable. The flexible display device, which may be capable of being transformed into various shapes, is easy to carry and improves a user's convenience.

Meanwhile, a flexural deformation may occur or may be viewed in a folding area of the foldable flexible display device, and thus, research aimed at preventing the flexural deformation is required.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device capable of improving a flexural deformation in a folding area thereof.

Embodiments provide a display device that may include a display module including a first non-folding area, a folding area, and a second non-folding area; a support plate disposed below the display module, a foam coating layer including a base portion and a foaming agent included in the base portion, the foam coating layer being disposed directly on the support plate; and a barrier layer disposed between the display module and the foam coating layer and including an elastic material.

The foaming agent of the foam coating layer may have a substantially spherical shape and may include a shell portion and a core portion.

The shell portion of the foaming agent of the foam coating layer may include a thermoplastic resin.

The foaming agent may have a weight equal to or greater than about 3 wt % and equal to or less than about 15 wt % of a total weight of the base portion.

The base portion of the foam coating layer may include a polymer resin having a weight-average molecular weight equal to or greater than about 1000 and equal to or less than about 15000.

The foam coating layer may have a Young's modulus equal to or greater than about 1 MPa and equal to or less than about 100 MPa at room temperature.

The foam coating layer may have a density equal to or greater than about 0.3 $g/cm^3$ and equal to or less than about 0.7 $g/cm^3$.

The barrier layer may have a yield strain equal to or greater than about 1.0% and equal to or less than about 2.5%.

The barrier layer may include an ultra-thin glass, a glass fiber, or a stainless steel.

The barrier layer may have a Young's modulus equal to or greater than about 2 GPa and equal to or less than about 200 GPa at room temperature.

Embodiments provide a display device that may include a display module including a folding area foldable with respect to a folding axis extending in a first direction; a first non-folding area adjacent to a side of the folding area; and a second non-folding area adjacent to another side of the folding area; a barrier layer disposed below the display module and including an elastic material; a first support plate disposed below the first non-folding area; a second support plate disposed below the second non-folding area and spaced apart from the first support plate in a second direction substantially perpendicular to the first direction; a first foam coating layer disposed on the first support plate; and a second foam coating layer disposed on the second support plate and spaced apart from the first foam coating layer in the second direction.

Each of the first foam coating layer and the second foam coating layer may include a base portion and a foaming agent included in the base portion, the foaming agent having a substantially spherical shape.

The barrier layer may have a yield strain equal to or greater than about 1.0% and equal to or less than about 2.5%.

Each of the first foam coating layer and the second foam coating layer may include a plurality of sub-coating layers.

The first foam coating layer may include a first sub-coating layer disposed on the first support plate; and a second sub-coating layer disposed on the first sub-coating layer, the second foam coating layer may include a third sub-coating layer disposed on the second support plate; and a fourth sub-coating layer disposed on the third sub-coating layer, and a minimum separation distance between the first sub-coating layer and the third sub-coating layer adjacent to the first sub-coating layer may be less than a minimum separation distance between the second sub-coating layer and the fourth sub-coating layer adjacent to the second sub-coating layer.

A minimum separation distance (D3) between a line extending from an end of the first support plate overlapping the folding area and a line extending from an end of the second sub-coating coating layer may satisfy the following: DP+RC≤D3≤DP+3RC, a minimum separation distance (D4) between a line extending from an end of the second support plate overlapping the folding area and a line extending from an end of the fourth sub-coating layer may satisfy the following: DP+RC≤D4≤DP+3RC, wherein DP denotes a minimum separation distance between the first support plate and the second support plate, and RC denotes a radius of curvature of the folding area.

The display device may further include a first cushion layer disposed below the first support plate and including a first hole; and a second cushion layer disposed below the second support plate and including a second hole, and each of the first hole of the first cushion layer and the second hole of the second cushion layer may be substantially parallel to the first direction.

The display device may further include an adhesive portion filled in each of the first hole of the first cushion layer and the second hole of the second cushion layer.

The adhesive portion may have a thickness less than a thickness of each of the first cushion layer and the second cushion layer.

A shortest distance between the first hole of the first cushion layer and the second hole of the second cushion layer in the second direction may be equal to or greater than about 25 mm and equal to or less than about 35 mm.

According to the above, the flexural deformation in the folding area of the display device may be reduced, and thus, the phenomenon in which the flexural deformation of the display device is perceived by the user may decrease.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1A:
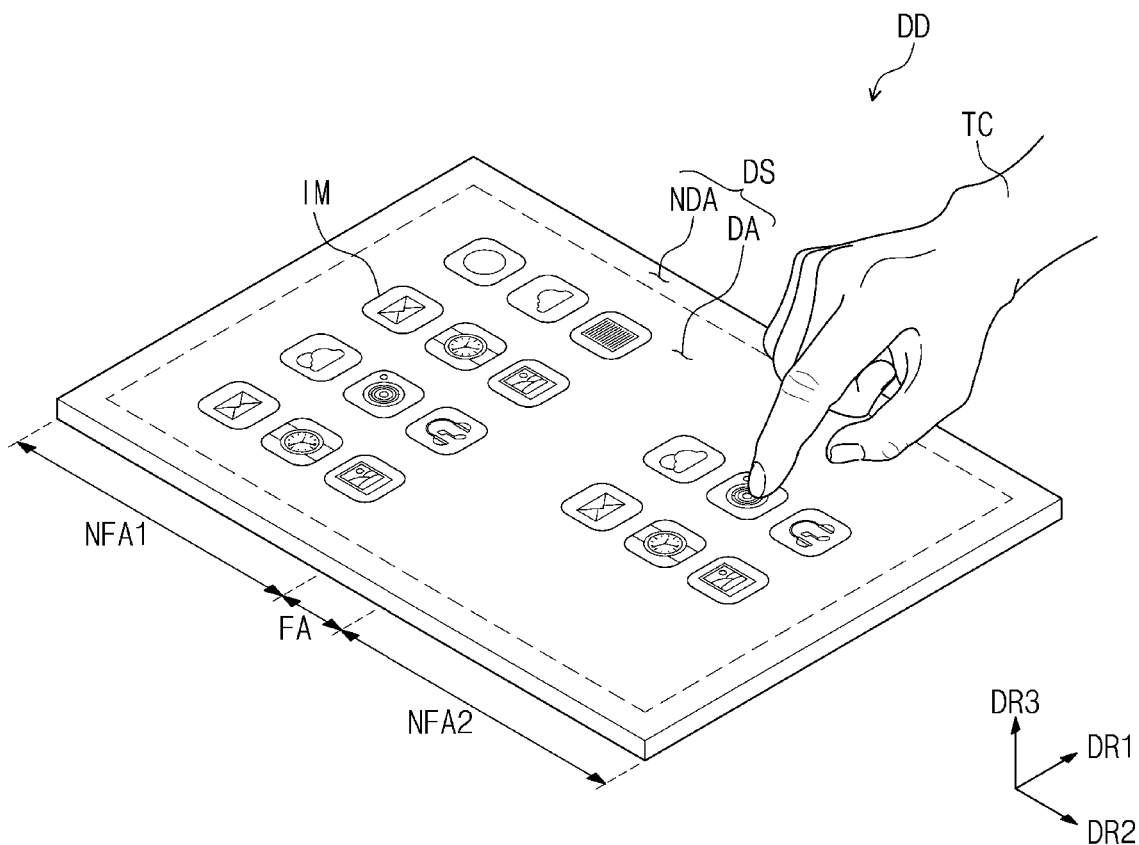
FIG. 1A is a perspective view showing a display device according to an embodiment.

The disclosure may be variously modified and realized in many different forms, and thus embodiments will be illustrated in the drawings and described in detail hereinbelow. However, the disclosure should not be limited to the disclosed forms, and instead be construed to include all modifications, equivalents, or replacements included in the spirit and scope of the disclosure.

In the disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components may be exaggerated for effective description of the technical content.

As used herein, the term "and/or" includes any and all combinations of one or more of the associated listed items.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures but are not limited thereto.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprises" and/or "comprising", "includes" and/or "including", "has", "have" and/or "having" and their variations when used in this specification, specify the presence of stated features, integers, steps, operations, elements, and/or components, but do not preclude the presence or addition of one or more other features, integers, steps, operations, elements, components, and/or groups thereof.

Hereinafter, a display device according to the disclosure will be explained in detail with reference to the accompanying drawings.

Figure 1B:
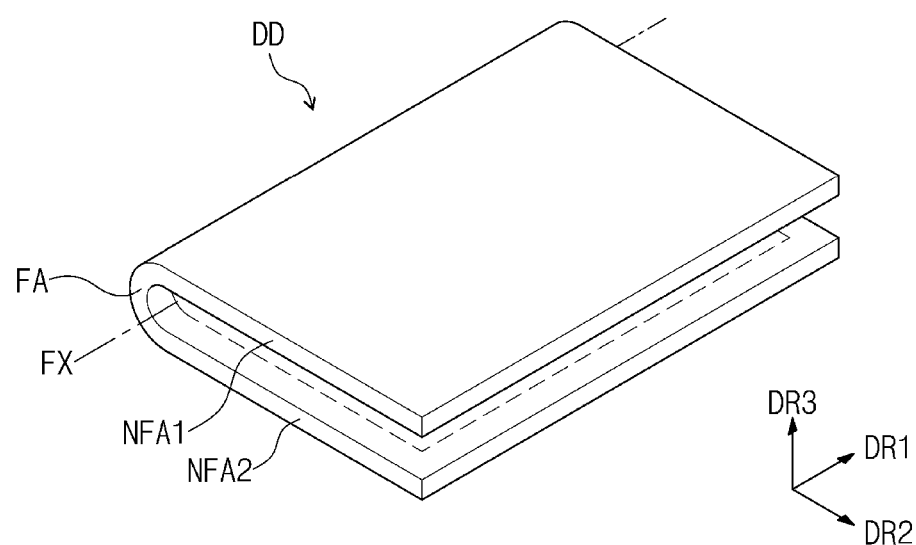
FIG. 1B is a perspective view showing a folded or foldable state of the display device shown in FIG. 1A.
Figure 2A:
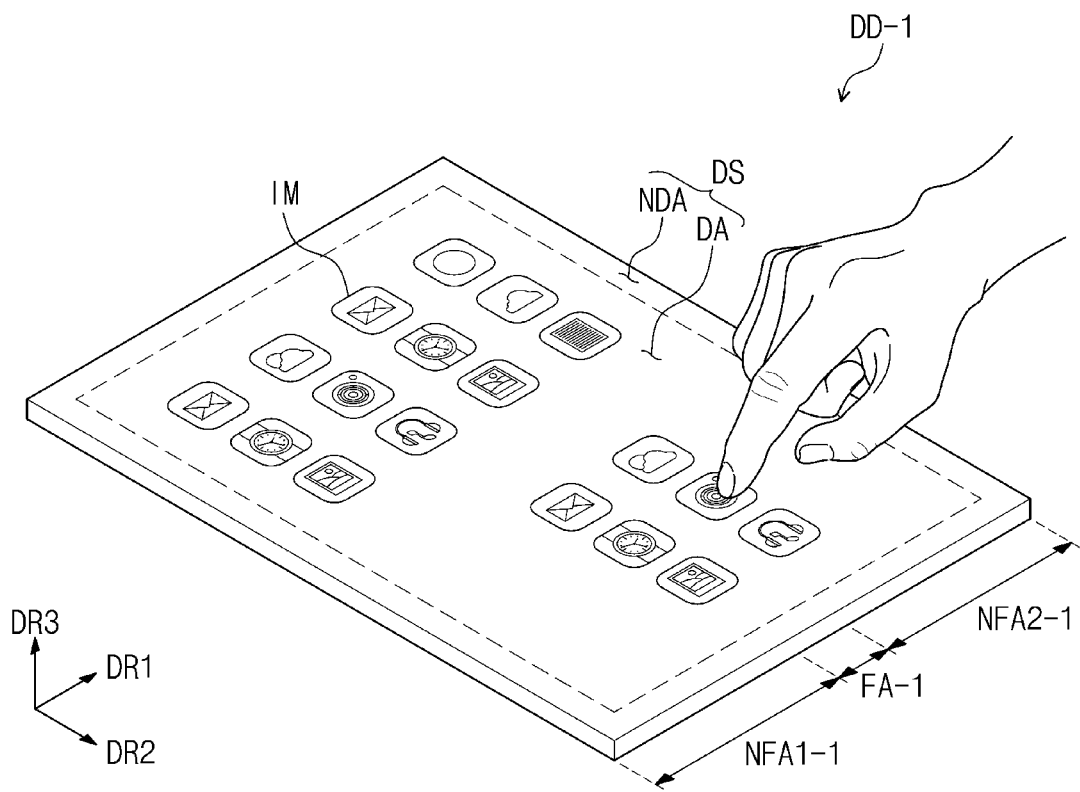
FIG. 2A is a perspective view showing a display device according to an embodiment.
Figure 2B:
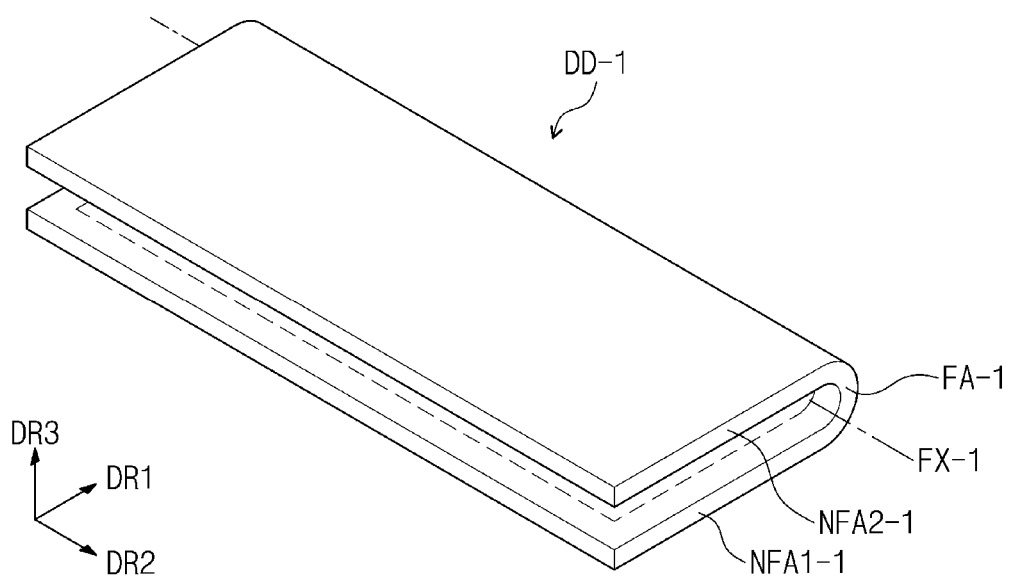
FIG. 2B is a perspective view showing a folded or foldable state of the display device shown in FIG. 2A.

FIGS. 1A and 2A are perspective views showing display devices DD and DD-1 according to an embodiment. FIG. 1B is a perspective view showing a folded or foldable state of the display device DD shown in FIG. 1A. FIG. 2B is a perspective view showing a folded or foldable state of the display device DD-1 shown in FIG. 2A.

Referring to FIGS. 1A, 1B, 2A, and 2B, the display devices DD and DD-1 may be foldable display devices. The display devices DD and DD-1 may be applied to a large-sized electronic item, such as a television set, a monitor, and the like, and a small and medium-sized electronic item, such as a mobile phone, a tablet computer, a game unit, a navigation unit, and the like within the spirit and the scope of the disclosure.

An upper surface of each of the display devices DD and DD-1 may be defined as a display surface DS. The display surface DS may correspond to a plane defined by a first directional axis DR1 and a second directional axis DR2 in a case that the display devices DD and DD-1 are in an unfolded state.

The display surface DS may include a display area DA and a non-display area NDA defined or formed around or adjacent to the display area DA. An image IM may be displayed through the display area DA, and the image IM may not be displayed through the non-display area NDA. The image IM may include a still image or images or a motion image or images. FIGS. 1A and 2A show a plurality of application icons as representative examples of the image IM.

The display area DA may have a substantially quadrangular shape. The non-display area NDA may surround or be adjacent to the display area DA. However, they should not be limited thereto or thereby, and the display area DA and the non-display area NDA may be designed to have other shapes. For example, the non-display area NDA may be defined or formed to be adjacent to only one or a side of the display area DA or may be omitted. The display devices DD and DD-1 may include various embodiments, and they should not be particularly limited.

The display device DD may include a first non-folding area NFA1, a folding area FA, and a second non-folding area NFA2, which may be defined or formed therein and sequentially arranged or disposed in the first directional axis DR1. For example, the folding area FA may be defined or formed between the first non-folding area NFA1 and the second non-folding area NFA2. The display device DD-1 may include a first non-folding area NFA1-1, a folding area FA-1, and a second non-folding area NFA2-1, which may be defined or formed therein and sequentially arranged or disposed in the second directional axis DR2. For example, the folding area FA-1 may be defined or formed between the first non-folding area NFA1-1 and the second non-folding area NFA2-1.

The display devices DD and DD-1 may be folded or foldable about folding axes FX and FX-1, respectively. For example, the folding areas FA and FA-1 may be folded or foldable respectively about the folding axes FX and FX-1. The folding areas FA and FA-1 may be a portion in which deformation occurs in a case that the display devices DD and DD-1 are folded or foldable or bent and may correspond to a bending portion of the display devices DD and DD-1.

Referring to FIGS. 1A and 1B, the folding axis FX may extend in the first directional axis DR1. The folding axis FX may be a short axis substantially parallel to short sides of the display device DD. Referring to FIGS. 2A and 2B, the folding axis FX-1 may extend in the second directional axis DR2. The folding axis FX-1 may be a long axis substantially parallel to long sides of the display device DD-1.

In a case that the display device DD is folded or foldable, the display surface corresponding to the first non-folding area NFA1 and the display surface corresponding to the second non-folding area NFA2 may face each other. In a case that the display device DD-1 is folded or foldable, the display surface corresponding to the first non-folding area NFA1-1 and the display surface corresponding to the second non-folding area NFA2-1 may face each other. Accordingly, the display surface DS may not be exposed to the outside in a folded or foldable state of the display devices DD and DD-1, however, this is merely an example. Although not shown in figures, in a case that the display devices DD and DD-1 are respectively folded or foldable, the display surface corresponding to the first non-folding areas NFA1 and NFA1-1 and the display surface corresponding to the second non-folding areas NFA2 and NFA2-1 may be opposite to each other. Accordingly, the display surface DS may be exposed to the outside in the folded or foldable state of the display devices DD and DD-1.

The display devices DD and DD-1 according to embodiments shown in each of FIG. 1A and FIG. 2A include one folding area. However, the number of the folding areas and the number of the non-folding areas should not be limited thereto or thereby. For example, each of the display devices DD and DD-1 may include more than two non-folding areas and folding areas disposed between the non-folding areas.

Hereinafter, the structure of the display device DD folded or foldable about the short axis shown in FIGS. 1A and 1B will be described as a representative example, however, the disclosure should not be limited thereto or thereby, and descriptions described hereinafter may be applied to the display device DD-1 folded or foldable about the long axis.

Figure 3:
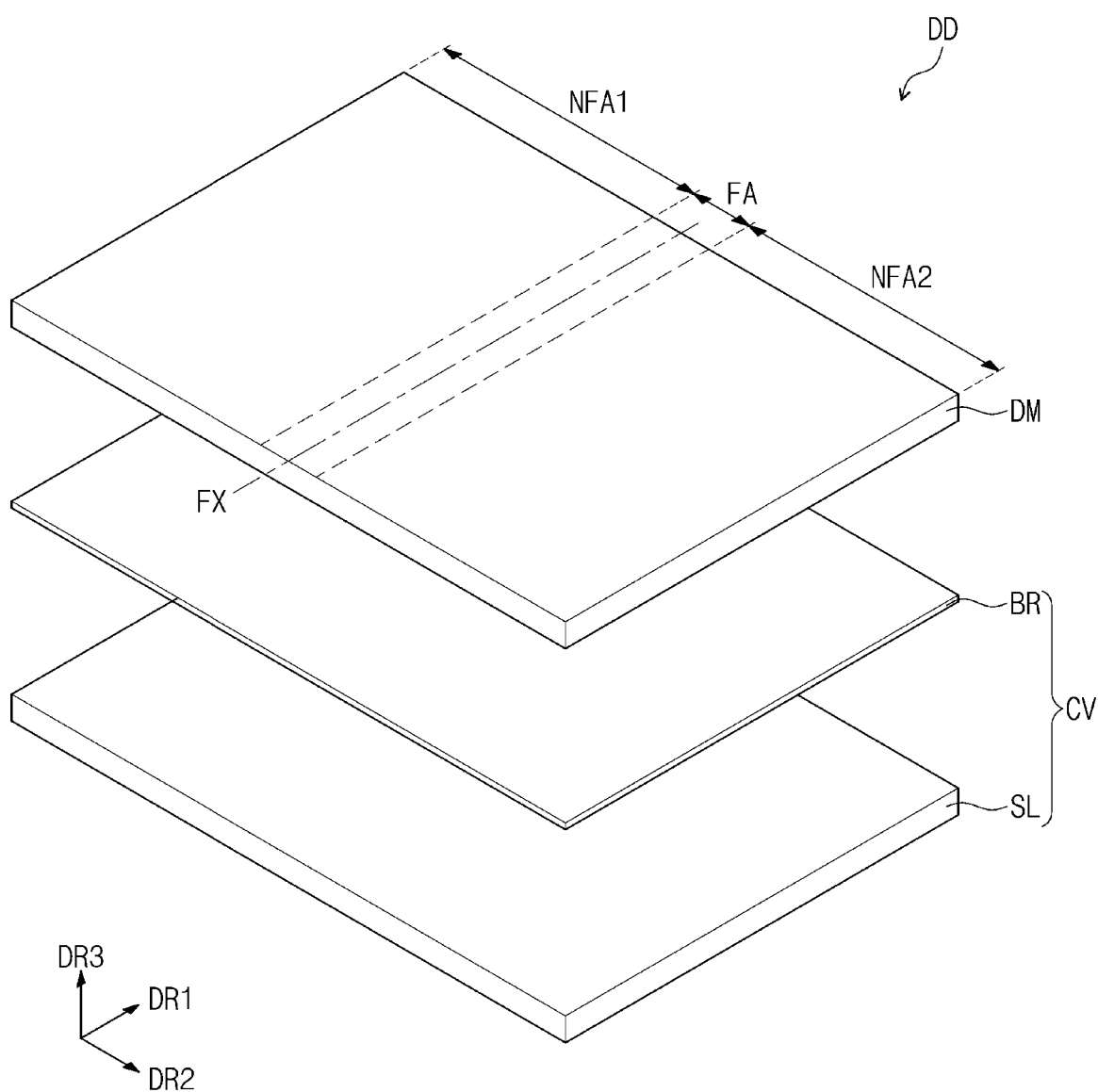
FIG. 3 is an exploded perspective view showing a display device according to an embodiment.

FIG. 3 is an exploded perspective view showing the display device DD according to an embodiment. The display device DD may include a display module DM and a cover member CV disposed under or below the display module DM. Although not shown in figures, the display device DD may further include a case (or housing) to accommodate the display module DM and the cover member CV.

The display module DM may display the image IM (refer to FIG. 1A) and may sense an external input TC (refer to FIG. 1A). The external input TC may be a user input. The user input may include various types of external inputs, such as a part of the user's body, light, heat, pen, or pressure. In FIG. 1A, the external input TC is shown as a user's hand being applied to the display surface DS, however, this is merely an example. For example, the display module DM may sense the external input TC applied to a side or rear surface of the display device DD depending on its structure, and, it should not be limited to a specific embodiment.

The display module DM may have a substantially rectangular shape with short sides extending in the first directional axis DR1 and long sides extending in the second directional axis DR2. The display module DM may include the folding area FA folded or foldable about the folding axis FX extending in the first directional axis DR1, the first non-folding area NFA1 defined or formed adjacent to one or a side of the folding area FA, and the second non-folding area NFA2 defined or formed adjacent to the other side of the folding area FA.

The cover member CV may be disposed under or below the display module DM. The cover member CV may support a rear surface of the display module DM and may protect the display module DM. The cover member CV may include a barrier portion BR having an elastic force that may be advantageous for restoration of deformation while protecting the display module DM and a support portion SL supporting the display module DM and having an impact resistance.

Figure 4:
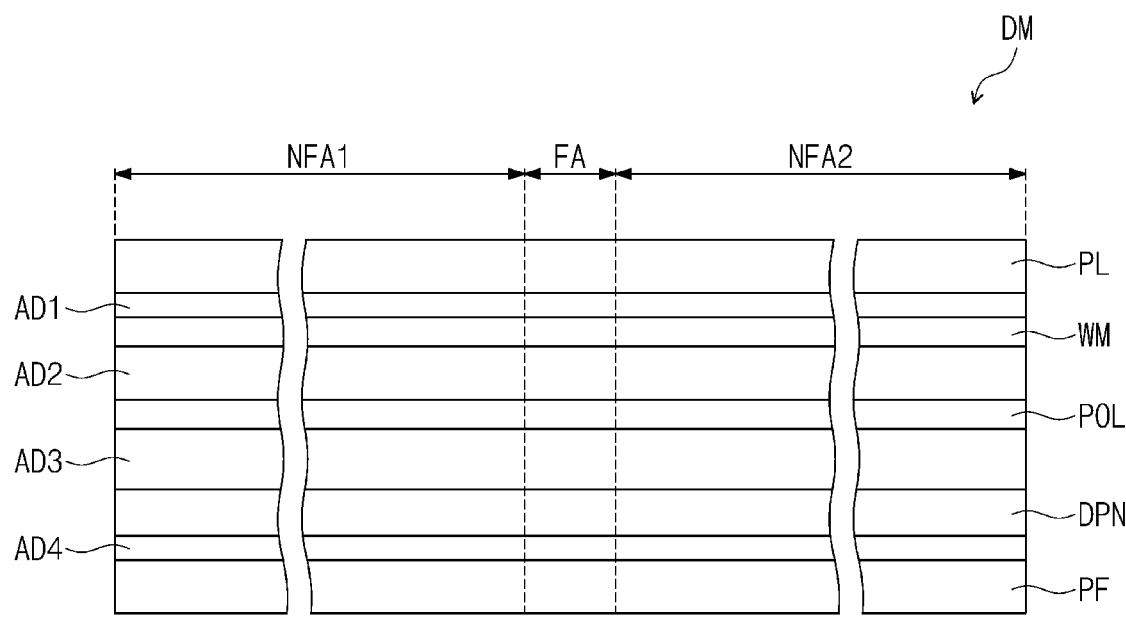
FIG. 4 is a schematic cross-sectional view showing a display module according to an embodiment.
Figure 4:
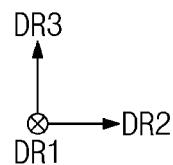

FIG. 4 is a schematic cross-sectional view showing the display module DM according to an embodiment. FIG. 4 shows the cross-section corresponding to a plane defined by the second directional axis DR2 and a third directional axis DR3. The third directional axis DR3 may be perpendicular to the plane defined by the first directional axis DR1 and the second directional axis DR2.

Referring to FIG. 4, the display module DM may include a protective layer PL, a window WM, an anti-reflective layer POL, a display panel DPN, and a protective film PF. The display module DM may further include adhesive layers AD1, AD2, AD3, and AD4 disposed between components thereof. The display module DM should not be limited to the structure shown in FIG. 4, and some components included in the display module DM may be formed through successive processes and may be disposed without being attached to each other by the adhesive layers. In this case, some of the adhesive layers AD1, AD2, AD3, and AD4 may be omitted.

The display panel DPN may be a light emission display panel, however, it should not be particularly limited. For instance, the display panel DPN may be a liquid crystal display panel, an organic light emitting display panel, or a quantum dot light emitting display panel.

The anti-reflective layer POL may be disposed on the display panel DPN. The anti-reflective layer POL may reduce a reflectance of an external light incident thereto from the above of the window WM. The anti-reflective layer POL according to an embodiment may include a retarder and a polarizer. Each of the retarder and the polarizer may be a film type or liquid crystal coating type. The retarder and the polarizer may further include a protective film.

The anti-reflective layer POL may include color filters. The color filters may have a predetermined alignment. The alignment of the color filters may be determined by taking into account emission colors of pixels included in the display panel DPN. The anti-reflective layer POL may further include a black matrix disposed adjacent to the color filters.

The anti-reflective layer POL may include a destructive interference structure. For instance, the destructive interference structure may include a first reflection layer and a second reflection layer, which may be disposed on different layers from each other. A first reflection light and a second reflection light, which may be respectively reflected by the first reflection layer and the second reflection layer, may interfere destructively with each other, and thus, the reflectance of the external light may be reduced.

The window WM may be disposed on the anti-reflective layer POL. The window WM may protect structures disposed thereunder from external scratch and impact. The window WM may include an optically transparent material. Accordingly, the image generated by the display panel DPN may be provided to the user after passing through the window WM.

The window WM may further include a functional coating layer. The functional coating layer may include at least one of an anti-fingerprint layer, an anti-reflective layer, and a hard coating layer, however, the functional coating layer included in the window WM should not be limited thereto or thereby.

The shape of the window WM may be easily changed to correspond to a change in shape of the foldable display device DD and may protect the display panel DPN even though the shape of the window WM may be changed. The window WM may include an ultra-thin glass (UTG).

The protective layer PL may be disposed on the window WM. The impact resistance of the display device DD may be improved by the protective layer PL. The protective layer PL may be a polymer film or a tempered glass film. The protective layer PL may be omitted according to embodiments.

The protective film PF may be disposed under or below the display panel DPN. The protective film PF may protect a rear surface of the display panel DPN. The protective film PF may be a synthetic resin film. For example, the protective film PF may be a polyimide film or a polyethylene terephthalate film. However, the protective film PF should not be limited thereto or thereby.

Meanwhile, the display module DM may further include an input sensing layer (not shown) disposed on the display panel DPN. The input sensing layer (not shown) may be disposed directly on the display panel DPN through successive processes. The input sensing layer (not shown) may include a plurality of insulating layers and a plurality of conductive layers. The conductive layers may form a sensing electrode sensing the external input, a sensing line electrically connected to the sensing electrode, and a sensing pad electrically connected to the sensing line.

The adhesive layers AD1, AD2, AD3, and AD4 may be disposed between the protective layer PL, the window WM, the anti-reflective layer POL, the display panel DPN, and the protective film PF to attach the protective layer PL, the window WM, the anti-reflective layer POL, the display panel DPN, and the protective film PF to each other. Some of the adhesive layers AD1, AD2, AD3, and AD4 may be omitted. The adhesive layers AD1, AD2, AD3, and AD4 may include a conventional adhesive. For example, each of the adhesive layers AD1, AD2, AD3, and AD4 may include a pressure sensitive adhesive (PSA), an optical clear adhesive (OCA), or an optical clear resin (OCR).

Figure 5:
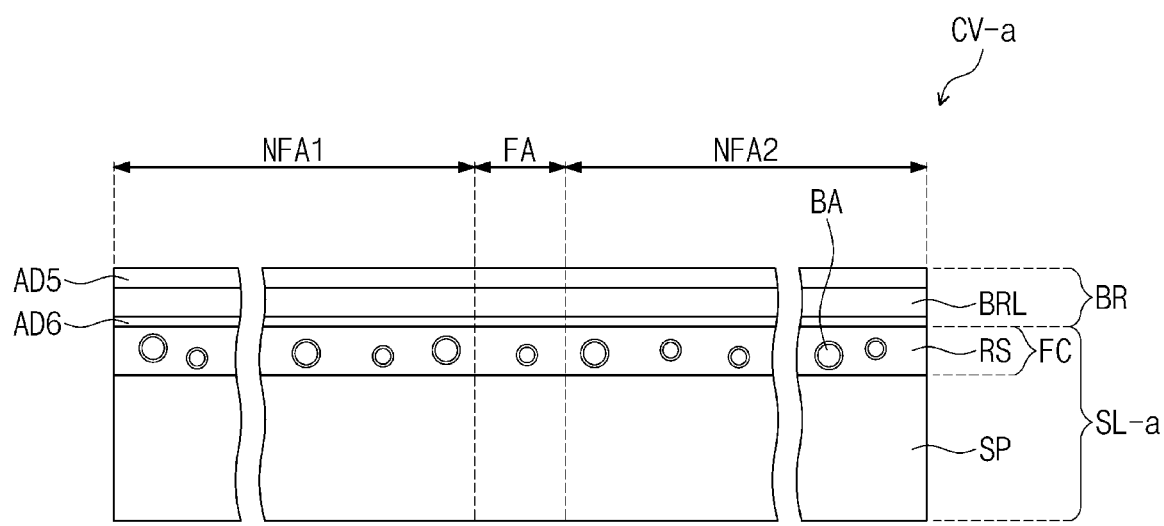
FIG. 5 is a schematic cross-sectional view showing a cover member according to an embodiment.
Figure 5:
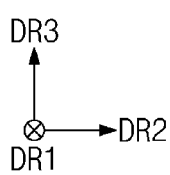

FIG. 5 is a schematic cross-sectional view showing a cover member CV-a according to an embodiment. The cover member CV-a may include a support portion SL-a and a barrier portion BR. The barrier portion BR may be disposed on the support portion SL-a.

The barrier portion BR may include a barrier layer BRL and adhesive layers AD5 and AD6 respectively disposed on and under or below the barrier layer BRL. One of the adhesive layers AD5 and AD6 may be omitted.

The barrier layer BRL including an elastic material may be disposed under or below the display module DM (refer to FIG. 4). As the barrier layer BRL is disposed, a degree of a flexural deformation of the display device DD may be reduced, and it may be advantageous for restoration of the deformation of the display device DD even though the display device DD is repeatedly folded or foldable and unfolded by the user.

The barrier layer BRL may include a high elastic material. The barrier layer BRL having the high elastic material may have a yield strain equal to or greater than about 1.0% and equal to or smaller or less than about 2.5%. Since the barrier layer BRL has a wide elastic limit area, the barrier layer BRL may be advantageous for restoration of the deformation caused by the external force.

The barrier layer BRL may include a material having strong rigidity. For example, the barrier layer BRL may include a material that may be resistant to the deformation. The barrier layer BRL may have a Young's modulus equal to or greater than about 2 Gpa and equal to or smaller or less than about 200 Gpa at room temperature.

The barrier layer BRL may include a polymer material, a glass material, or a metal material, which has a relatively strong rigidity. For example, the barrier layer BRL may include polyimide, polycarbonate, polyethylene terephthalate, the ultra-thin glass (UTG), a glass fiber, a stainless steel (SUS), or a nano stainless steel.

The support portion SL-a may be disposed under or below the barrier portion BR in which the barrier layer BRL is included. The support portion SL-a may include a support plate SP and a foam coating layer FC disposed directly on the support plate SP. The foam coating layer FC may be directly coated on the support plate SP using a slit coating method, a screen printing coating method, or the like within the spirit and the scope of the disclosure. Accordingly, an adhesive layer to attach the support plate SP to the foam coating layer FC may not be needed.

The foam coating layer FC disposed directly on the support plate SP may include a base portion RS and a foaming agent BA. Properties of the foam coating layer FC, such as elasticity and impact resistance, may be controlled by adjusting the type of the base portion RS, the type of the foaming agent BA, or the content of the foaming agent BA. Accordingly, the foam coating layer FC may have a predetermined elastic force and may absorb impacts applied thereto.

The foaming agent BA included in the foam coating layer FC may be distributed in the base portion RS. The foaming agent BA may have a substantially spherical shape having a size of micro-scale. Hereinafter, the foaming agent BA included in the foam coating layer FC will be described in detail with reference to FIGS. 6A and 6B.

Figure 6A:
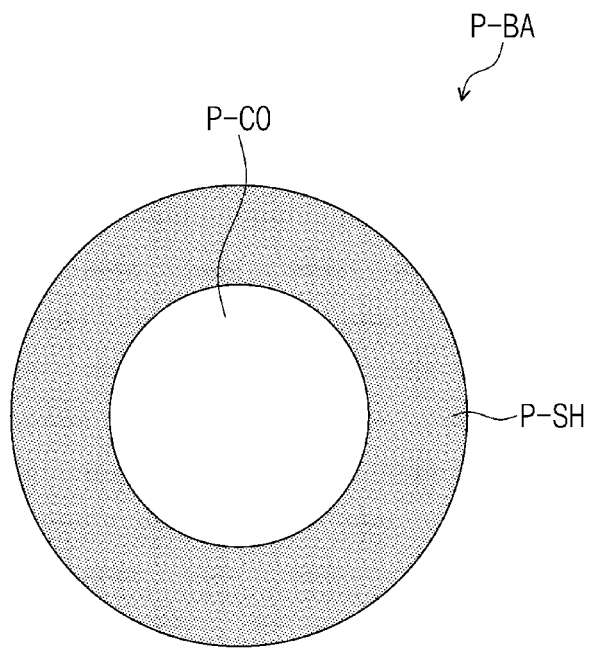
FIG. 6A is a schematic cross-sectional view showing a foaming agent before foaming according to an embodiment.
Figure 6B:
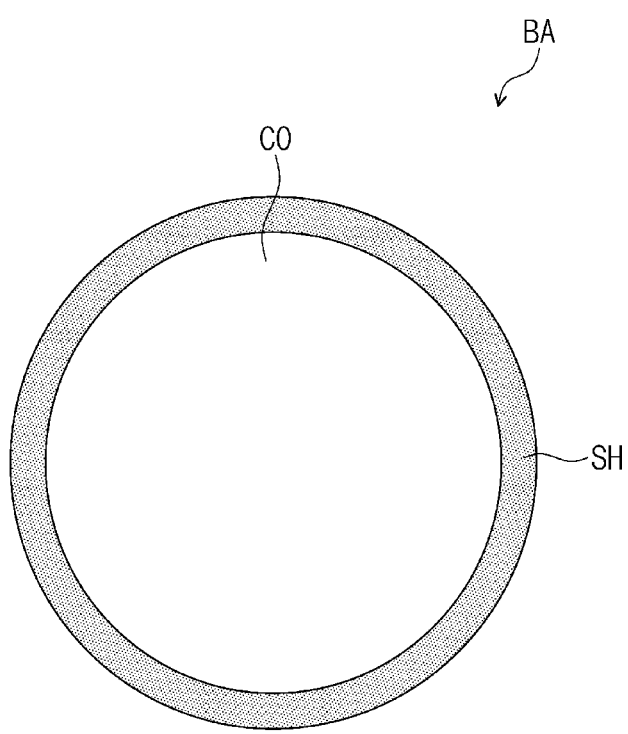
FIG. 6B is a schematic cross-sectional view showing the foaming agent shown in FIG. 6A after foaming.

FIG. 6A is a schematic cross-sectional view showing a foaming agent P-BA before foaming according to an embodiment. FIG. 6B is a schematic cross-sectional view showing the foaming agent BA shown in FIG. 6A after foaming. Referring to FIG. 6B, the foaming agent BA may include a shell portion SH and a core portion CO.

The foam coating layer FC may be formed by adding the foaming agent P-BA before foaming into the base portion RS and foaming the added foaming agent P-BA. Referring to FIG. 6A, the foaming agent P-BA before foaming may have a shape in which a shell portion P-SH may surround a core portion P-CO. The shell portion P-SH may be a thermoplastic resin. The core portion P-CO may include an organic solvent, and the organic solvent may be liquid hydrocarbon. For example, the foaming agent P-BA before foaming may be, but not limited to, a micro-capsule in which the thermoplastic resin may surround the liquid hydrocarbon.

In a case that heat is applied to the foaming agent P-BA before foaming, the shell portion P-SH starts to be softened, and substantially simultaneously, a foaming material contained in the core portion P-CO is vaporized. Accordingly, an internal pressure of the core portion P-CO increases, and the core portion P-CO begins to expand. In a case that a certain temperature is reached, a pressure inside the foaming agent, a surface tension of the shell portion, and an external pressure applied to the foaming agent are balanced, and an expansion volume of the foaming agent may be maximized. In a case that the foaming agent is continuously heated, the external pressure applied to the foaming agent increases, and the foaming agent may contract again.

The foaming agent BA after forming included in the foam coating layer FC may have the substantially spherical shape in which the shell portion SH may surround the core portion CO and may finally increase in volume when compared with a volume of the foaming agent P-BA before foaming. The core portion CO of the foaming agent BA after forming may have a volume greater than that of the core portion P-CO of the foaming agent P-BA before foaming, and a thickness of the shell portion SH of the foaming agent BA after forming may be thinner than that of the shell portion P-SH of the foaming agent P-BA before foaming. Due to the expansion in volume of the foaming agent BA, a density of the foam coating layer FC containing the foaming agent BA is reduced.

The size of the foaming agent P-BA before foaming, the foaming agent BA after foaming and the temperature at which the foaming of the foaming agent P-BA occur may vary depending on the type of the foaming agent. The foam coating layer FC may be dried during a process of foaming using the temperature at which the foaming occurs, however, this is merely an example. The foaming process and the drying process of the foam coating layer FC may be performed separately from each other.

The degree of the increase in volume of the foaming agent BA may be changed by adjusting the type or content of the foaming agent BA contained in the foam coating layer FC. The density of the foam coating layer FC may be changed depending on the degree of the increase in volume of the foaming agent BA. For example, the density of the foam coating layer FC may be equal to or greater than about 0.3 g/cm³ and equal to or smaller or less than about 0.7 g/cm³.

The foam coating layer FC may have a predetermined elastic force and a predetermined impact resistance by adjusting the content of the foaming agent BA contained in the foam coating layer FC. In a case that the content of the foaming agent BA is small, the impact applied to the foam coating layer FC may not be easily absorbed and the elastic force may decrease, and in a case that the content of the foaming agent BA is large, a durability of the foam coating layer FC may decrease. Therefore, it may be necessary to adjust the content of the foaming agent BA in a proper range. The foaming agent BA contained in the foam coating layer FC may have a weight equal to or greater than about 3 wt % and equal to or smaller or less than about 15 wt % in a case that a total weight of the base portion RS is about 100 wt %.

The foam coating layer FC may absorb the impact more easily by the expanded volume of the core portion CO. The foam coating layer FC may have the Young's modulus equal to or greater than about 1 MPa and equal to or smaller or less than about 100 MPa at room temperature. Accordingly, the support plate SP on which the foam coating layer FC is directly disposed may have improved impact resistance.

The type of the base portion RS included in the foam coating layer FC may be controlled. The base portion RS may be a polymer resin. For example, the base portion RS may be a polyurethane resin or a urethane acrylate resin. The polymer resin may have flexibility that varies depending on the type of reactants. For example, in the case of the polyurethane resin, a hard or soft polyurethane resin may be formed by using different types of polyol and isocyanate.

The base portion RS may be, but not limited to, a polymer resin having a weight-average molecular weight equal to or greater than about 1000 and equal to or smaller or less than about 15000. In a case that the weight-average molecular weight of the polymer resin is smaller or less than about 1000, a viscosity of the base portion RS is lowered, and thus, the foam coating layer FC may not be coated on the support plate SP to be tightly adhered with the support plate SP. In a case that the weight-average molecular weight of the polymer resin is greater than about 15000, the pressure applied to the foaming agent BA distributed in the base portion RS increases, and as a result, the foaming agent BA may not maintain the substantially spherical shape and may be distorted.

Referring to FIG. 5, the support portion SL-a may include the support plate SP. The support plate SP may prevent or alleviate the deformation of the display module DM due to the external force. Accordingly, although the external force may be applied to the support plate SP, the display module DM may maintain the relatively flat state.

Figure 7A:
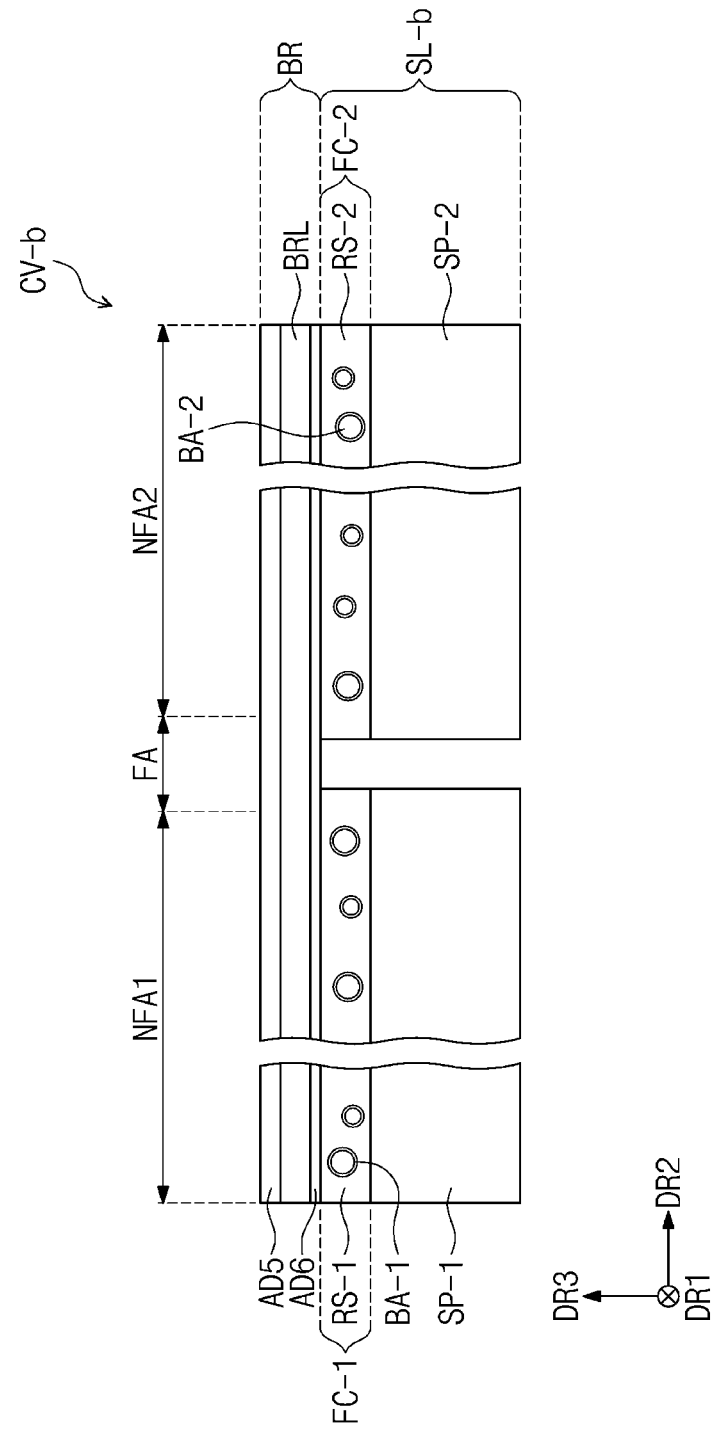
FIG. 7A is a schematic cross-sectional view showing a cover member according to an embodiment.

The support plate SP may include a flexible material or a folding pattern in an area corresponding to the folding area FA to alleviate the deformation of the display module DM. As another example, the support plate SP may be provided as a plurality of support plates SP-1 and SP-2 spaced apart from each other in the folding area FA as shown in FIG. 7A. The support plate SP included in the display device DD should not be limited thereto or thereby.

The support plate SP may be a metal plate. For example, the support plate SP may include a stainless steel, aluminum, or an alloy thereof.

The support portion SL-a and the barrier layer BRL may be attached to each other by the adhesive layer AD6 (referred to as a "sixth adhesive layer") disposed on the lower surface of the barrier layer BRL. The cover member CV-a may be attached to the rear surface of the display module DM by the adhesive layer AD5 (referred to as a "fifth adhesive layer") disposed on the upper surface of the barrier layer BRL.

The adhesive layers AD5 and AD6 may include a conventional adhesive. Each of the adhesive layers AD5 and AD6 may include an acrylic-based resin or a silicon-based resin. For example, each of the adhesive layers AD5 and AD6 may include a pressure sensitive adhesive (PSA), an optical clear adhesive (OCA), or an optical clear resin (OCR).

The adhesive layers AD5 and AD6 may have different thicknesses. The fifth adhesive layer AD5 that attaches the barrier layer BRL to the display module DM may be thicker than the sixth adhesive layer AD6 that attaches the barrier layer BRL to the support portion SL-a. For example, the fifth adhesive layer AD5 may have a thickness of about 25 μm, and the sixth adhesive layer AD6 may have a thickness of about 10 μm. However, the thickness of the fifth and sixth adhesive layers AD5 and AD6 should not be limited thereto or thereby.

The display device DD according to an embodiment may include the barrier layer BRL including the elastic material and disposed under or below the display module DM, and the foam coating layer FC including the base portion RS disposed directly on the support plate SP and the foaming agent BA distributed in the base portion RS. The deformation occurring in the folding area FA of the display device DD may be reduced by the barrier layer BRL including the elastic material. The display device DD may have the impact resistance by the foam coating layer FC including the base portion RS and the foaming agent BA distributed in the base portion RS. The adhesive layer is not required to be disposed between the support plate SP and the foam coating layer FC as the foam coating layer FC is disposed directly on the support plate SP, and the foam coating layer FC is coated to have a thickness smaller or less than about 100 μm. Accordingly, the thickness of the stack structure of the display device DD in which the deformation occurs during the folding operation may be reduced. Thus, the impact resistance of the display device DD may be enhanced without significantly increasing the deformation in the folding area FA of the display device DD.

FIG. 7A is a schematic cross-sectional view showing a cover member CV-b according to an embodiment. The cover member CV-b may include a support portion SL-b including support plates SP-1 and SP-2 spaced apart from each other in the second directional axis DR2. The support plates SP-1 and SP-2 may be spaced apart from each other in the folding area FA. The support plates SP-1 and SP-2 may include a first support plate SP-1 and a second support plate SP-2. The first plate SP-1 may overlap the first non-folding area NFA1 and the second plate SP-2 may overlap the second non-folding area NFA2.

The cover member CV-b may include a barrier portion BR. Descriptions on the barrier portion BR shown in FIG. 5 may be applied to the barrier portion BR of the cover member CV-b.

The support portion SL-b may include a first foam coating layer FC-1 disposed directly on the first support plate SP-1 and a second foam coating layer FC-2 disposed directly on the second support plate SP-2. The first foam coating layer FC-1 and the second foam coating layer FC-2 may be spaced apart from each other in the second directional axis DR2. Descriptions on the foam coating layer FC described with reference to FIGS. 5, 6A, and 6B may be applied to the first foam coating layer FC-1 and the second foam coating layer FC-2. Thus, detailed descriptions of the first foam coating layer FC-1 and the second foam coating layer FC-2 will be omitted, and different features will be mainly described.

The first and second foam coating layers FC-1 and FC-2 may be spaced apart from each other in the folding area FA. As the first and second foam coating layers FC-1 and FC-2 may be spaced apart from each other, the first and second foam coating layers FC-1 and FC-2 may not be subjected to a tensile force or stress force in a case that the display device DD is folded or foldable. Accordingly, the first and second foam coating layers FC-1 and FC-2 spaced apart from each other may be designed to strengthen resistance to impact even though the first and second foam coating layers FC-1 and FC-2 have a relatively lower Young's modulus and restoration force than those of the foam coating layer formed in a single piece. For example, base portions RS-1 and RS-2 respectively included in the first and second foam coating layers FC-1 and FC-2 may be relatively harder than that of the base portion included in foam coating layer formed in the single piece and may have a relatively greater modulus than that of the base portion included in foam coating layer formed in the single piece.

The first and second foam coating layers FC-1 and FC-2 may be directly coated on the support plates SP-1 and SP-2 spaced apart from each other, respectively, without being attached by an adhesive layer. For example, since the adhesive layers is not interposed between the first foam coating layer FC-1 and first support plate SP-1, and second foam coating layer FC-2 and the second support plate SP-2, a process of attaching the first and second foam coating layers FC-1 and FC-2 to the first and second support plates SP-1 and SP-2 is omitted, and thus a manufacturing process of the cover member CV-b may be simplified.

The base portion RS-1 included in the first foam coating layer FC-1 and the base portion RS-2 included in the second foam coating layer FC-2 may be the same type as each other or different types from each other. A foaming agent BA-1 included in the first foam coating layer FC-1 and a foaming agent BA-2 included in the second foam coating layer FC-2 may be the same type as each other or different types from each other and may have the same content as each other or different contents from each other.

Figure 7B:
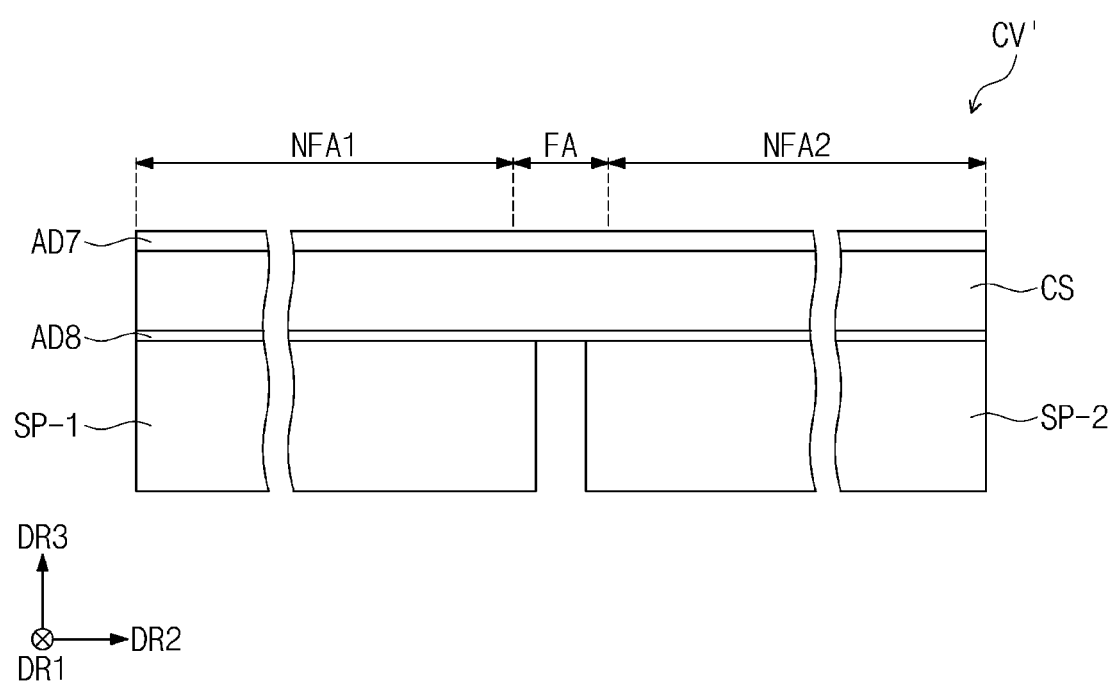
FIG. 7B is a schematic cross-sectional view showing a cover member according to a comparative example.

FIG. 7B is a schematic cross-sectional view showing a cover member CV' according to a comparative example. Hereinafter, differences between the cover member CV-b shown in FIG. 7A and the cover member CV' shown in FIG. 7B will be mainly described.

The cover member CV' according to the comparative example may include a cushion layer CS and an adhesive layer AD8 (referred to as an "eighth adhesive layer"), which may be disposed above support plates SP-1 and SP2 spaced apart from each other. The cushion layer CS may be attached to the support plates SP-1 and SP-2 spaced apart from each other by the eighth adhesive layer AD8. The cushion layer CS may be attached to a component, for example, a display module, disposed above the cushion layer CS by an adhesive layer AD7 (referred to as a "seventh adhesive layer").

The seventh and eighth adhesive layers AD7 and AD8 may include a conventional adhesive, for example, an acrylic-based resin or a silicon-based resin. Each of the seventh and eighth adhesive layers AD7 and AD8 may include a pressure sensitive adhesive, an optical clear adhesive, or an optical clear resin.

The difference between the cover member CV' according to the comparative example and the cover member CV-b according to an embodiment is whether the barrier layer BRL is included. As the barrier layer BRL including the elastic material is included in the cover member CV-b, the deformation restoration force of the display device DD may be improved, and the deformation degree of the display device DD may be reduced.

Another difference between the cover member CV' according to the comparative example and the cover member CV-b according to an embodiment is the stack structure in which the deformation occurs by the folding operation. The barrier portion BR included in the cover member CV-b according to an embodiment and the adhesive layers AD7 and AD8 and the cushion layer CS included in the cover member CV', according to the comparative example may be deformed while being bent by the folding operation of the display device.

Due to the difference in the stack structure, the thickness of the stack structure where the deformation occurs in the folding area FA during the folding operation may be different. The thickness of the stack structure in which the deformation occurs in the cover member CV-b according to an embodiment may be smaller or less than the thickness of the stack structure in which the deformation occurs in the comparative example. The thickness of the barrier layer BRL may be smaller or less than a thickness of the cushion layer CS of the comparative example. For example, the thickness of the barrier layer BRL may be within a range from about 10 µm to about 30 µm, and the thickness of the cushion layer CS may be about 100 µm. However, the thickness of each of the barrier layer BRL and the cushion layer CS should not be limited to the above mentioned values. In a case that the thickness of the stack structure in which the deformation occurs due to the repetitive folding and unfolding operations decreases, the flexural deformation in the folding area may be reduced.

Another difference between the cover member CV' according to the comparative example and the cover member CV-b according to an embodiment is whether the foam coating layers FC-1 and FC-2 disposed directly on the support plates SP-1 and SP-2 may be included.

The foam coating layers FC-1 and FC-2 may be disposed directly on the support plates SP-1 and SP-2, however, the cushion layer CS of the comparative example is attached to the support plates SP-1 and SP-2 by the eighth adhesive layer AD8. The foam coating layers FC-1 and FC-2 directly coated on the support plates SP-1 and SP-2 may have a relatively thin thickness compared with that of the cushion layer CS of the comparative example. For example, the foam coating layers FC-1 and FC-2 may have the thickness equal to or greater than about 30 µm and equal to or smaller or less than about 80 µm, and the cushion layer CS may have the thickness of about 100 µm. However, the thickness of each of the foam coating layers FC-1 and FC-2, and the cushion layer CS should not be limited to the above mentioned values.

The foam coating layers FC-1 and FC-2 according to an embodiment and the cushion layer CS according to the comparative example may allow the display device to have the impact resistance. The foam coating layers FC-1 and FC-2 according to an embodiment may easily absorb the impacts by the foaming agent BA-1 and BA-2 included in the foam coating layers FC-1 and FC-2 and may absorb the impact of the same strength even with the relatively thinner thickness than that of the cushion layer CS according to the comparative example.

The cushion layer CS of the comparative example in a single piece is disposed on the support plates SP-1 and SP-2 spaced apart from each other, however, the foam coating layers FC-1 and FC-2 of an embodiment may be disposed directly on the support plates SP-1 and SP-2, respectively, and may be spaced apart from each other in the folding area FA. Accordingly, the cushion layer CS of the comparative example is deformed in the folding area FA during the folding operation, so that the deformation restoration force of the cushion layer CS exerts influence on the deformation degree of the display device. However, the foam coating layers FC-1 and FC-2 of an embodiment may not be deformed during the folding operation, and thus, the influence of the foam coating layers FC-1 and FC-2 on the deformation of the display device may be smaller or less than that of the cushion layer CS. Therefore, the foam coating layers FC-1 and FC-2 of an embodiment may be designed to strengthen the resistance to impact when compared with the cushion layer CS of the comparative example.

Figure 8:
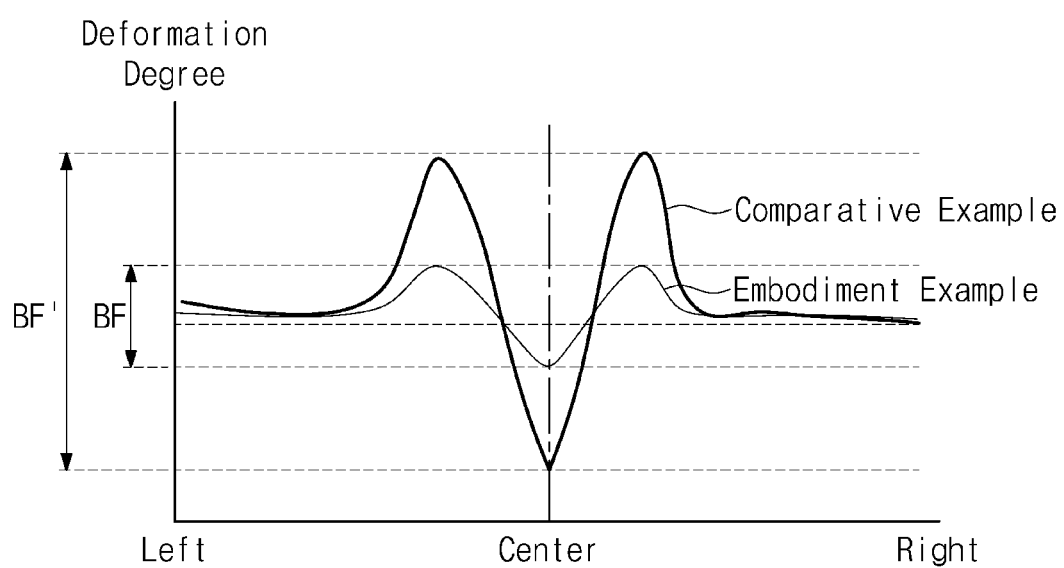
FIG. 8 is a graph showing a deformation degree of a display device according to an embodiment example and a comparative example.

FIG. 8 is a graph showing the deformation degree of the display device according to an embodiment example and a comparative example. The display device including the cover member CV-b shown in FIG. 7A indicates the display device according to an embodiment example, and the display device including the cover member CV' shown in FIG. 7B indicates the display device according to the comparative example.

The graph shows the deformation degree of the display device when viewed from a plane defined by the second directional axis DR2 and the third directional axis DR3. A center of a horizontal axis may correspond to a center of the folding area FA. When the display device is viewed from the plane defined by the first directional axis DR1 and the second directional axis DR2, upward convex portions of the graph may indicate a shape in which an upper surface of the display device protrudes, and downward convex portions of the graph may indicate a shape in which the upper surface of the display device is recessed.

The deformation degree means a difference in height between the highest point that is convex upward in the graph and the lowest point that is convex downward in the graph. As the deformation degree becomes greater, the degree to which the user perceives the deformation of the display device in the folding area increases. Accordingly, the phenomenon in which the flexural deformation of the display device is perceived by the user may decrease by reducing the deformation degree.

It is observed that the deformation degree BF' of the comparative example is greater than the deformation degree BF of an embodiment example in a case that the deformation degree BF of an embodiment example is compared with the deformation degree BF' of the comparative example. For example, the deformation degree BF' of the comparative example is in a range from about 15 µm to about 20 µm, and the deformation degree BF of an embodiment example may be about 5 µm. For example, the deformation degree BF of an embodiment example may be smaller or less than the deformation degree BF' of the comparative example, and the phenomenon in which the flexural deformation of the display device is perceived by the user decreases.

The deformation degree of the display device DD may be affected by the structure and the thickness of the cover member CV disposed under or below the display module DM. Since the thickness of the barrier portion BR of an embodiment example may be smaller or less than the thickness of the cushion layer CS and the adhesive layers AD7 and AD8 of the comparative example, the deformation degree of the display device DD is reduced. For example, as the cover member CV-b of an embodiment example may include the barrier layer BRL including the elastic material, it may be advantageous to restore the deformation. When comparing the display device DD of an embodiment example with that of the comparative example, the deformation degree of the display device DD of an embodiment example in the folding area FA may be reduced, and the impact resistance of the display device DD of an embodiment example may be maintained by the foam coating layers FC-1 and FC-2 disposed directly on the support plate SP1 and SP2.

Figure 9:
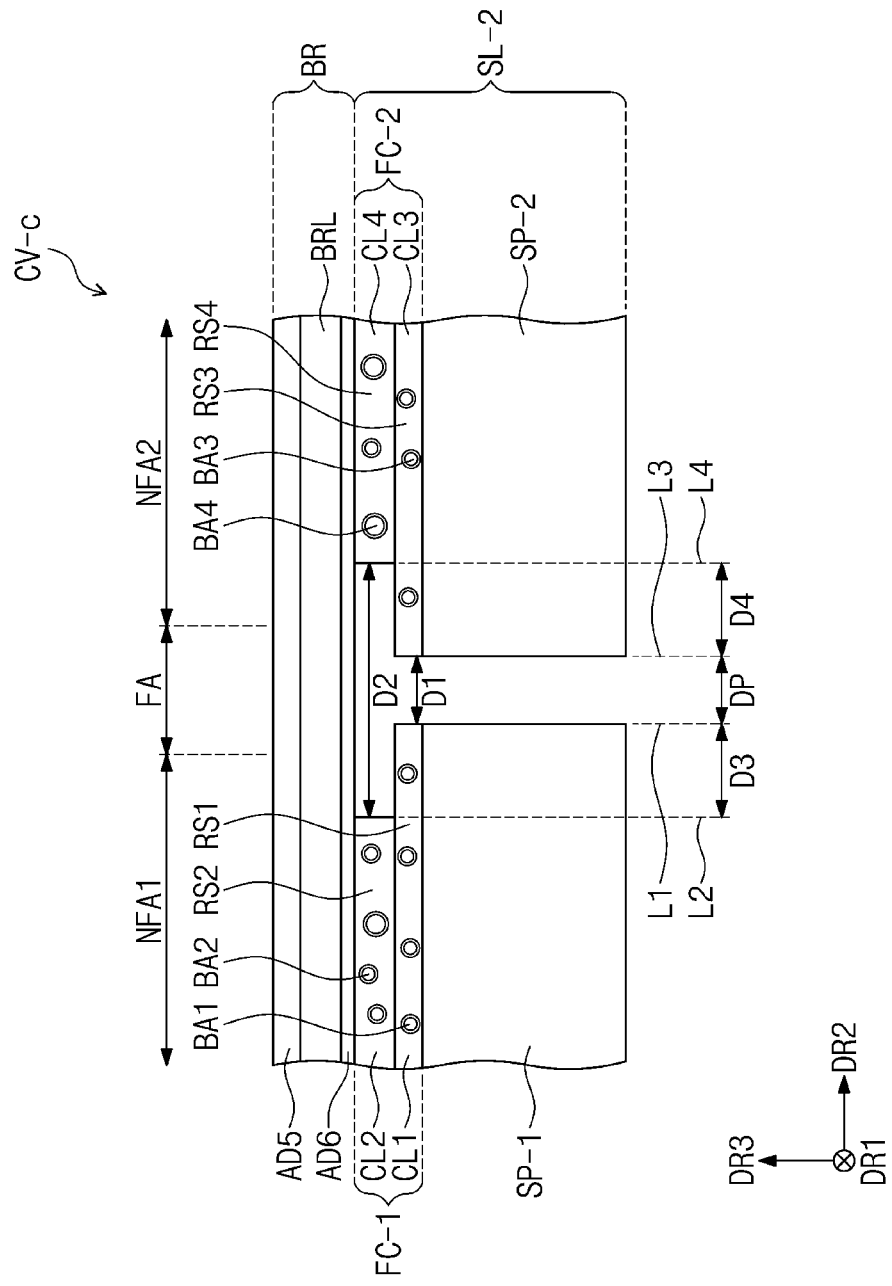
FIG. 9 is a schematic cross-sectional view showing a cover member according to an embodiment.

FIG. 9 is a schematic cross-sectional view showing a cover member CV-c according to an embodiment. Descriptions on the barrier portion BR described with reference to FIG. 5 may be applied to a barrier portion BR included in the cover member CV-c.

A support portion SL-2 included in the cover member CV-c may include first and second foam coating layers FC-1 and FC-2 spaced apart from each other and including a plurality of sub-coating layers CL1, CL2, CL3, and CL4. The number of the sub-coating layers should not be limited to that shown in FIG. 9, and three or more sub-coating layers may be disposed on each of first and second support plates SP-1 and SP-2. For example, sub-coating layers may be formed using a screen printing method through multiple processes, and foam coating layers including the plural sub-coating layers may be formed.

Referring to FIG. 9, the first foam coating layer FC-1 may include a first sub-coating layer CL1 disposed directly on the first support plate SP-1, and the second foam coating layer FC-2 may include a third sub-coating layer CL3 disposed directly on the second support plate SP-2. The first foam coating layer FC-1 may include a second sub-coating layer CL2 disposed on the first sub-coating layer CL1, and the second foam coating layer FC-2 may include a fourth sub-coating layer CL4 disposed on the third sub-coating layer CL3.

In a case that the sub-coating layers CL1, CL2, CL3, and CL4 are formed, an elastic force, a density, and an impact resistance of each of the sub-coating layers CL1, CL2, CL3, and CL4 may be controlled. Base portions RS1, RS2, RS3, and RS4 respectively included in the sub-coating layers CL1, CL2, CL3, and CL4 may be the same type as each other or different types from each other and may have the same molecular weight as each other or different molecular weights from each other. As another example, foaming agents BA1, BA2, BA3, and BA4 respectively included in the sub-coating layers CL1, CL2, CL3, and CL4 may be the same type as each other or different types from each other and may have the same content as each other or different molecular weights from each other. For example, properties of the sub-coating layers CL1, CL2, CL3, and CL4 may be the same as each other or different from each other by adjusting the type of the base portion, the molecular weight of the base portion, the type of the foaming agent, or the content of the foaming agent with respect to the base portion.

The shape of the foam coating layers FC-1 and FC-2 corresponding to the folding area FA may be changed by adjusting a thickness of or separation distances between the sub-coating layers CL1, CL2, CL3, and CL4 included in the foam coating layers FC-1 and FC-2. For example, the sub-coating layers stacked in the third directional axis DR3 may have a step difference therebetween. As another example, the separation distance between the sub-coating layers may increase as a distance from the support plates SP-1 and SP-2 increases, for example, as a distance from the barrier portion BR decreases, by adjusting the separation distances D1 and D2 between the sub-coating layers adjacent to each other in the second directional axis DR2. For example, the flexural deformation in the folding area FA may be reduced by adjusting the separation distances and the stack structure of the sub-coating layers CL1, CL2, CL3, and CL4.

A minimum separation distance D1 between the first sub-coating layer CL1 and the third sub-coating layer CL3 adjacent to the first sub-coating layer CL1 may be smaller or less than a minimum separation distance D2 between the second sub-coating layer CL2 and the fourth sub-coating layer CL4 adjacent to the second sub-coating layer CL2.

The second sub-coating layer CL2 and the fourth sub-coating layer CL4 may be formed to satisfy the following Equations. In a case that a minimum separation distance between a line L1 extending from one end of the first support plate SP-1, which may overlap the folding area FA, and a line L2 extending from one end of the second sub-coating coating layer CL2 is referred to as "D3" and a minimum separation distance between a line L3 extending from one end of the second support plate SP-2, which may overlap the folding area FA, and a line L4 extending from one end of the fourth sub-coating coating layer CL4 is referred to as "D4", D3 and D4 satisfy the following Equations 1 and 2, respectively.

$$DP+RC \leq D3 \leq DP+3RC \quad \text{Equation 1}$$

$$DP+RC \leq D4 \leq DP+3RC \quad \text{Equation 2}$$

In Equations 1 and 2, "DP" denotes a minimum separation distance between the first support plate SP-1 and the second support plate SP-2, and "RC" denotes a radius of curvature RC (refer to FIG. 10) of the folding area FA.

Figure 10:
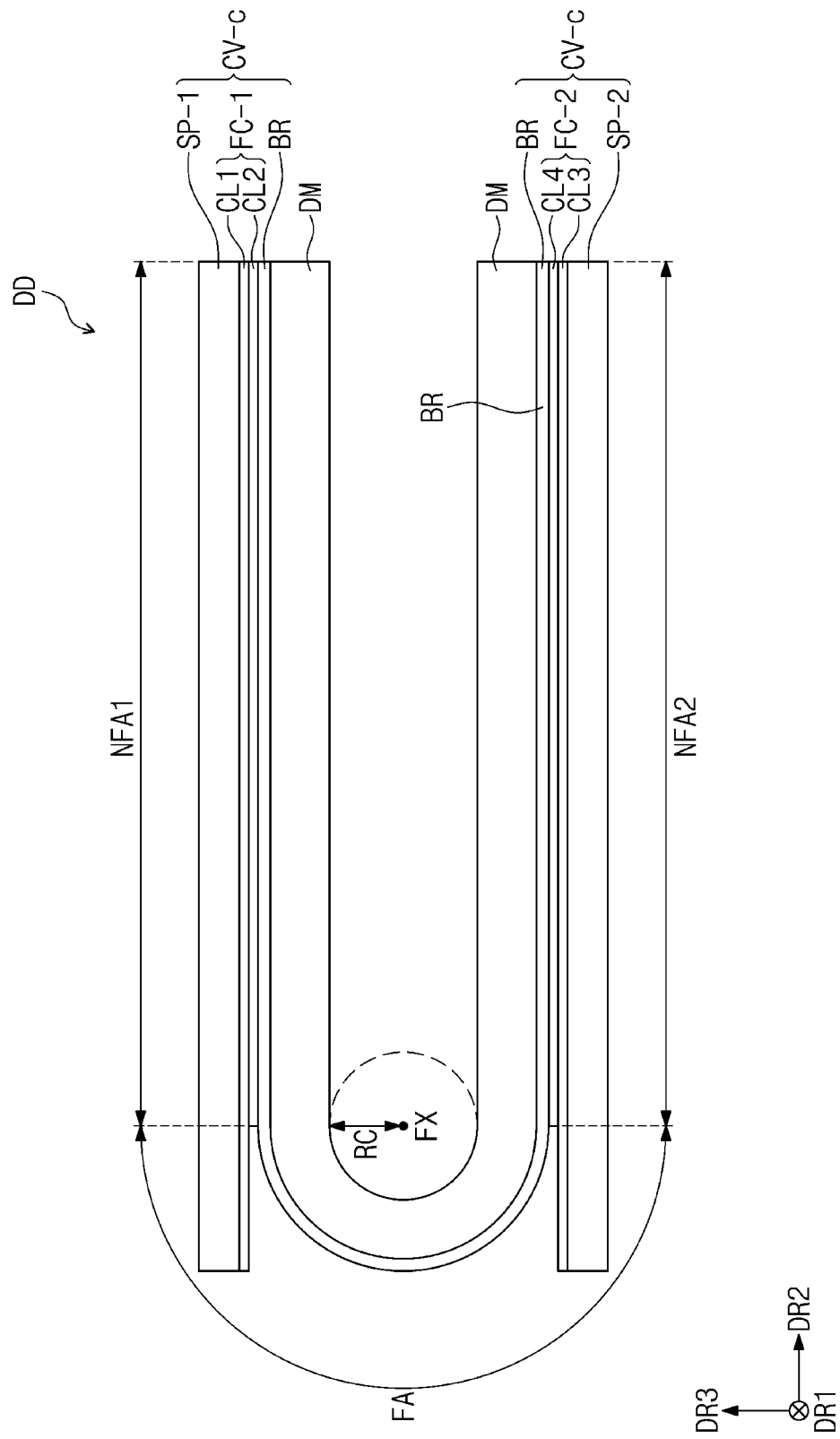
FIG. 10 is a schematic cross-sectional view showing a folded or foldable state of a display device according to an embodiment.

FIG. 10 is a schematic cross-sectional view showing the folded or foldable state of the display device DD according to an embodiment. In a case that the display device DD is folded or foldable, portions of the display module DM and the barrier portion BR, which correspond to the folding area FA, may be folded or foldable. The support plates SP-1 and SP-2 spaced apart from each other and the foam coating layers FC-1 and FC-2 spaced apart from each other may not may be folded or foldable even though the display device DD may be folded or foldable. Accordingly, the foam coating layers FC-1 and FC-2 may improve the impact resistance of the display device DD without significantly changing the deformation degree of the folding area FA of the display device DD.

Although not shown in FIG. 10, the foam coating layers FC-1 and FC-2 may include the base portion RS (refer to FIG. 5) and the foaming agent BA (refer to FIG. 5) distributed in the base portion RS. For example, the foam coating layers FC-1 and FC-2 may include the plural sub-coating layers CL1, CL2, CL3, and CL4. The shape of the foam coating layers FC-1 and FC-2 in the bending portion corresponding to the folding area FA may be changed by adjusting the separation distance between adjacent sub-coating layers among the sub-coating layers CL1, CL2, CL3, and CL4.

Figure 11A:
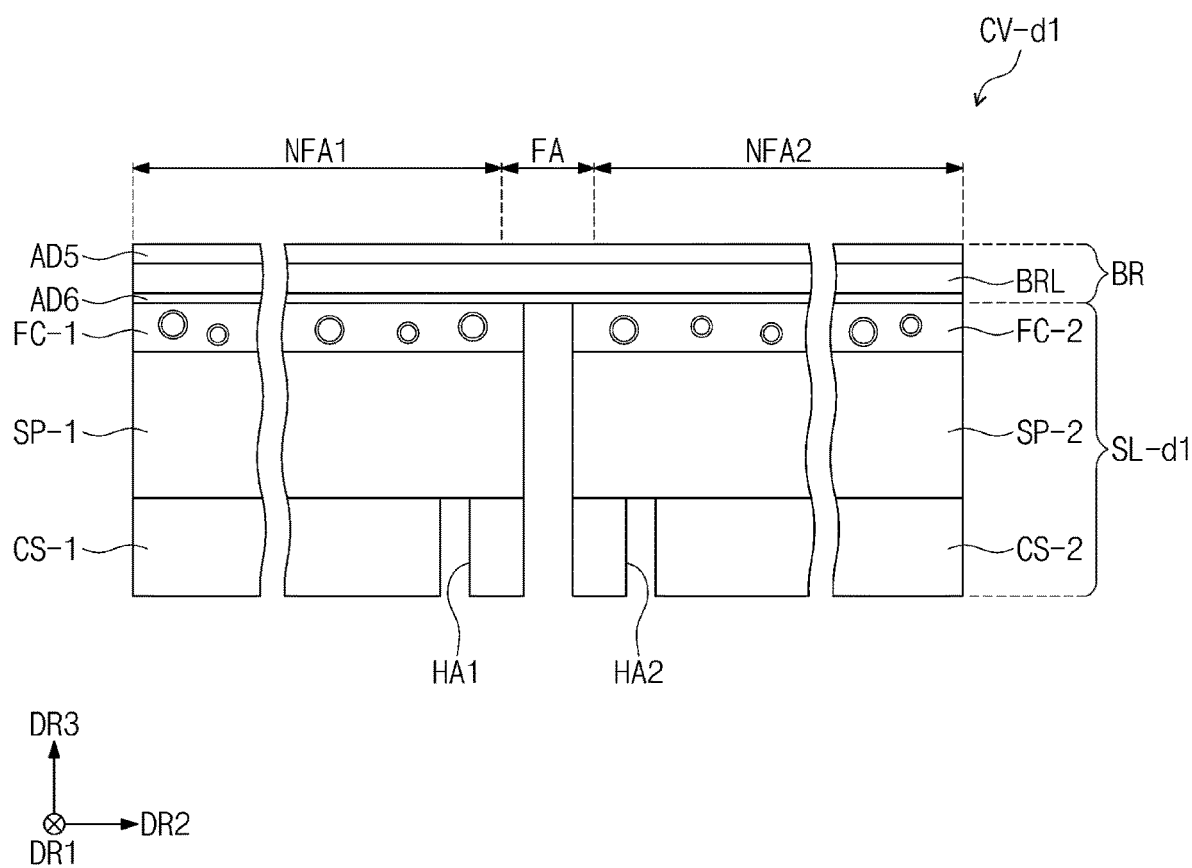
FIG. 11A is a schematic cross-sectional view showing a cover member according to an embodiment.
Figure 11B:
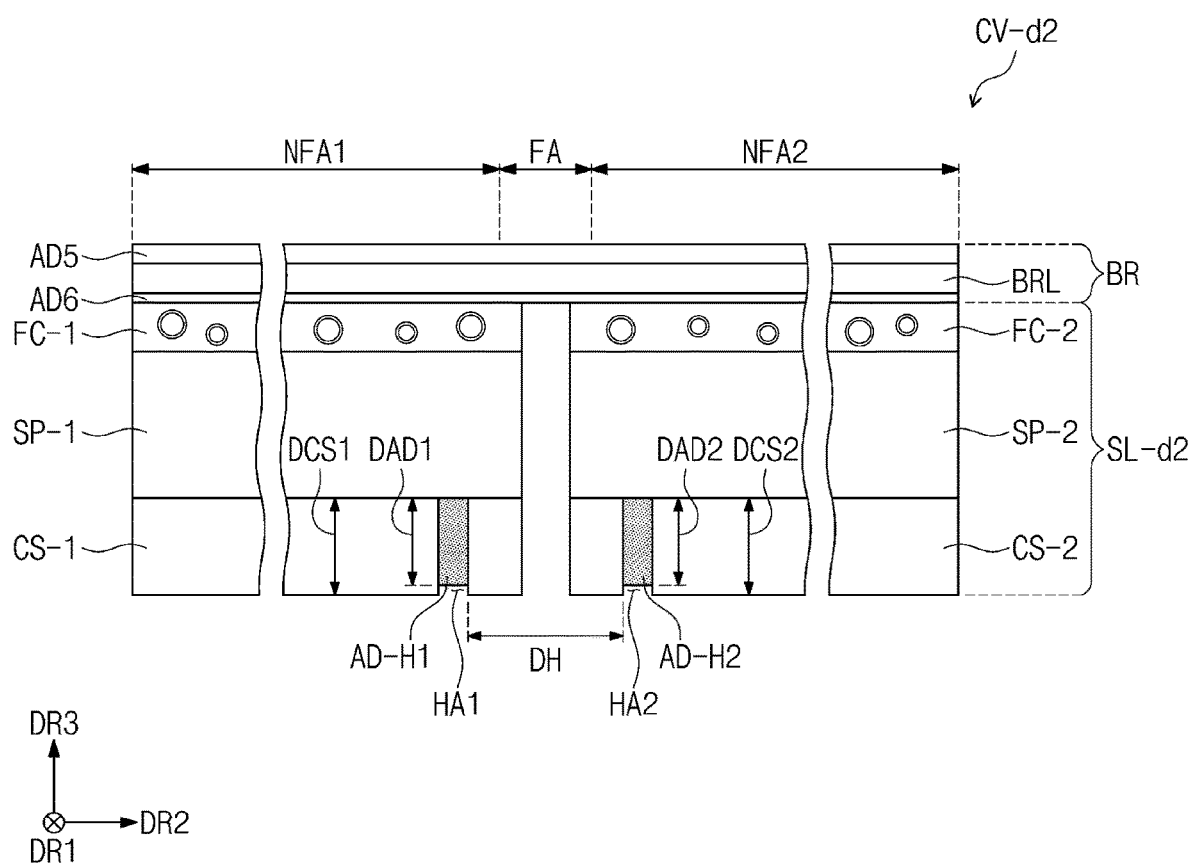
FIG. 11B is a schematic cross-sectional view showing a cover member according to an embodiment.

FIGS. 11A and 11B are schematic cross-sectional views showing cover members CV-d1 and CV-d2 according to an embodiment. As for the descriptions of components denoted by the same reference numerals, the above description may be equally applied.

Support portions SL-d1 and SL-d2 may further include first and second cushion layers CS-1 and CS-2 respectively disposed under or below first and second support plates SP-1 and SP-2. The first cushion layer CS-1 may be disposed under or below the first support plate SP-1, and the second cushion layer CS-2 may be disposed under or below the second support plate SP-2. The first cushion layer CS-1 and the second cushion layer CS-2 may be spaced apart from each other.

The first cushion layer CS-1 may support the first support plate SP-1, and the second cushion layer CS-2 may support the second support plate SP-2. The first cushion layer CS-1 and the second cushion layer CS-2 may prevent the folding area FA from being pressed or deformed from an external impact in a case that the display device DD is not folded or foldable. Each of the first cushion layer CS-1 and the second cushion layer CS-2 may include a sponge, a foam, or a urethane resin.

Figure 12:
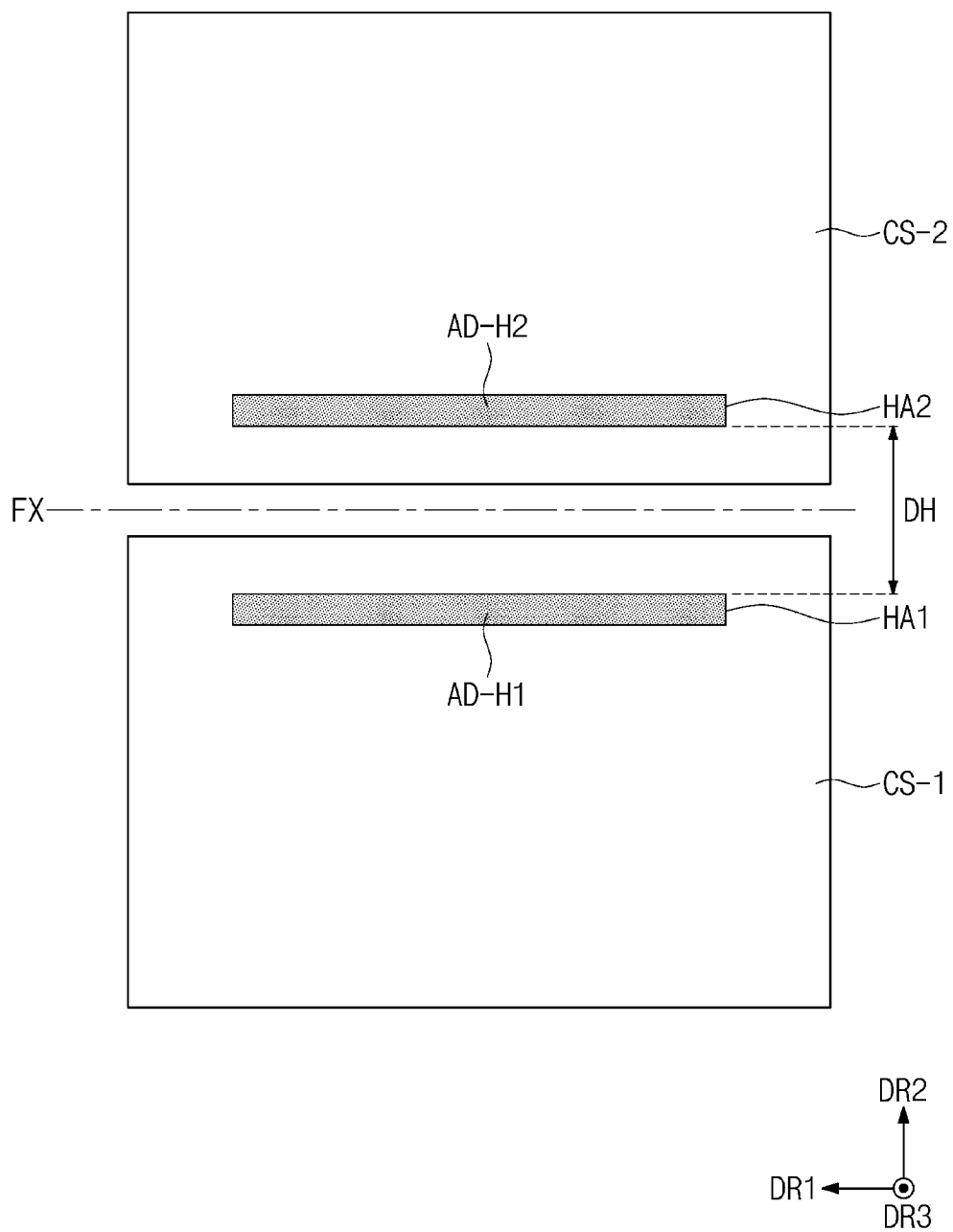
FIG. 12 is a plan view showing a cushion layer according to an embodiment.

Referring to FIGS. 11A and 11B, the first cushion layer CS-1 may be provided with a first hole HA1 defined or formed therethrough, and the second cushion layer CS-2 may be provided with a second hole HA2 defined or formed therethrough. FIG. 12 is a plan view showing the first cushion layer CS-1 and the second cushion layer CS-2 in a plane substantially parallel to the plane defined by the first directional axis DR1 and the second directional axis DR2. Referring to FIG. 12, each of the first and second holes HA1 and HA2 may have a substantially quadrangular shape with long sides extending in the first directional axis DR1 and short sides extending in the second directional axis DR2.

Referring to FIGS. 11B and 12, the first and second holes HA1 and HA2 may be filled with adhesive portions AD-H1 and AD-H2, respectively. The adhesive portions AD-H1 and AD-H2 may include a conventional adhesive. Each of the adhesive portions AD-H1 and AD-H2 may include a pressure sensitive adhesive (PSA), an optical clear adhesive (OCA), or an optical clear resin (OCR). For example, each of the adhesive portions AD-H1 and AD-H2 may include an acrylic-base resin or a silicon-based resin, however, the adhesive portions AD-H1 and AD-H2 should not be limited thereto or thereby.

Referring to FIG. 11B, the adhesive portion AD-H1 filled in the first hole HA1 of the first cushion layer CS-1 may have a thickness DAD1 smaller or less than a thickness DCS1 of the first cushion layer CS-1. The adhesive portion AD-H2 filled in the second hole HA2 of the second cushion layer CS-2 may have a thickness DAD2 smaller or less than a thickness DCS2 of the second cushion layer CS-2. For example, in a case that the thickness of each of the first and second cushion layers CS-1 and CS-2 is about 100 μm, the thickness of each of the adhesive portions AD-H1 and AD-H2 may be about 90 μm. However, the thickness of each of the first and second cushion layers CS-1 and CS-2 and the thickness of each of the adhesive portions AD-H1 and AD-H2 should not be limited thereto or thereby.

As shown in FIG. 11B, the adhesive portions AD-H1 and AD-H2 may have a substantially quadrangular shape in a cross-section thereof, and may be respectively inserted into the first and second holes HA1 and HA2 of the cushion layers CS-1 and CS-2 to have a substantially flat surface, however, they should not be limited thereto or thereby. The adhesive portions AD-H1 and AD-H2 may be respectively inserted into the first and second holes HA1 and HA2 of the cushion layers CS-1 and CS-2 to have a concave surface.

A shortest distance DH between the first hole HA1 and the second hole HA2 may exert an influence on the deformation degree in the folding area FA. The shortest distance DH may be equal to or greater than about 25 mm and equal to or smaller or less than about 35 mm. For example, the shortest distance DH may be about 30 mm. Accordingly, a shortest distance DH between the adhesive portions AD-H1 and AD-H2 respectively filled in the first and second holes HA1 and HA2 may be equal to or greater than about 25 mm and equal to or smaller or less than about 35 mm.

The deformation degree in the folding area FA may be changed depending on configurations of the first and second cushion layers CS-1 and CS-2 respectively disposed under or below the support plates SP-1 and SP-2. In a case that a value corresponding to change in height of a portion where the deformation occurs and a curvature value indicating the deformation degree of the bending portion may be relatively large, the deformation of the display device DD may be easily viewed from the outside.

The deformation degree and the curvature of an embodiment in which the first and second holes HA1 and HA2 may be defined or formed through the first and second cushion layers CS-1 and CS-2 and the adhesive portions AD-H1 and AD-H2 may be filled in the first and second holes HA1 and HA2 may be smaller or less than those of an embodiment in which the adhesive portions AD-H1 and AD-H2 may not be filled in the first and second holes HA1 and HA2. Accordingly, in a case that the adhesive portions AD-H1 and AD-H2 are provided or disposed under or below the support plates SP-1 and SP2, the phenomenon in which the flexural deformation is viewed may be improved.

Figure 13:
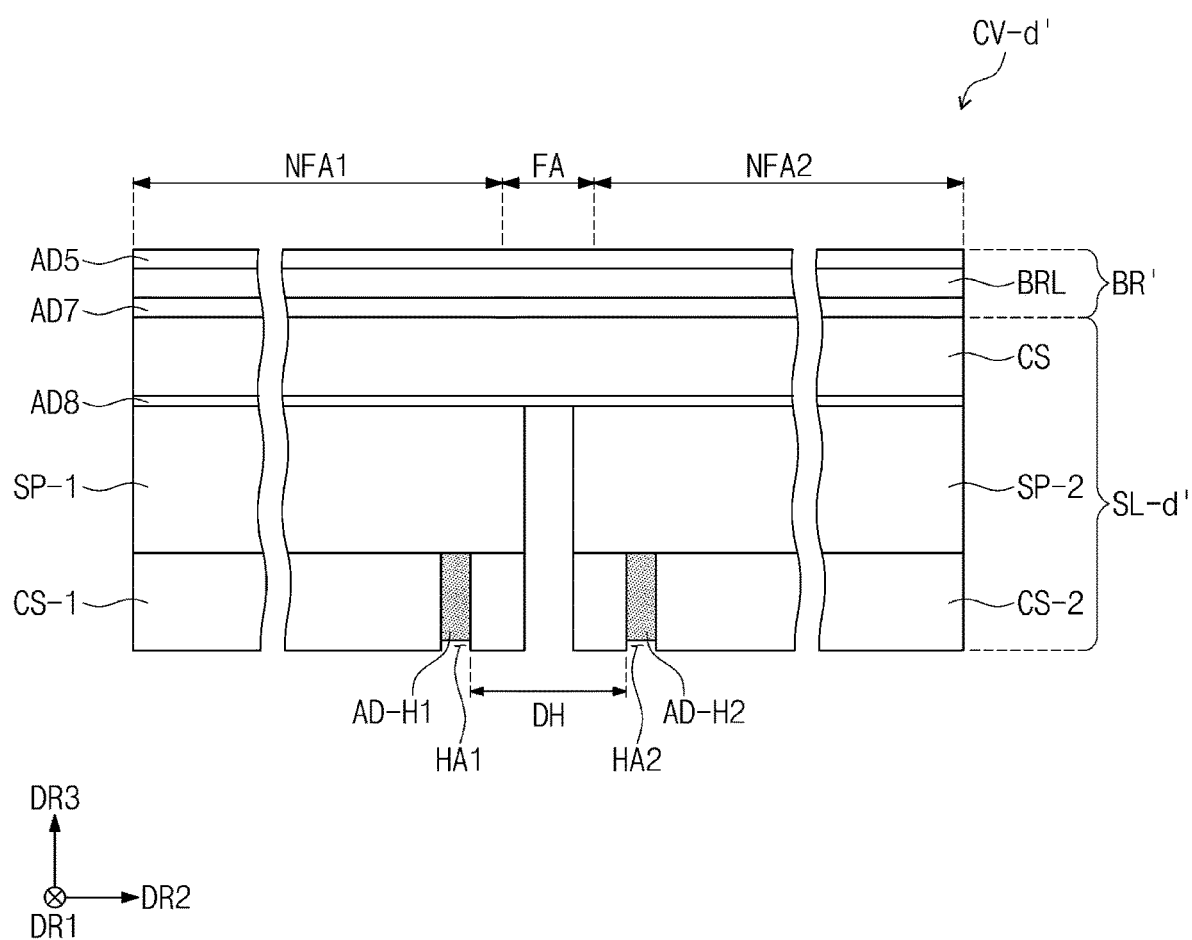
FIG. 13 is a schematic cross-sectional view showing a cover member according to a comparative example.

FIG. 13 is a schematic cross-sectional view showing a cover member CV-d' according to a comparative example. The cover member CV-d' may include a barrier portion BR' and a support portion SL-d' disposed under or below the barrier portion BR'. The barrier portion BR' may include adhesive layers AD5 and AD7 respectively disposed on and under or below a barrier layer BRL. The adhesive layer AD7 disposed under or below the barrier layer BRL attaches a cushion layer CS disposed at an upper portion of the support portion SL-d' to the barrier layer BRL.

The support portion SL-d' of the comparative example may include support plates SP-1 and SP-2 spaced apart from each other and the cushion layer CS disposed above the support plates SP-1 and SP-2. The support portion SL-d' of the comparative example may include an adhesive layer AD8 disposed between the support plates SP-1 and SP-2 and the cushion layer CS. The support portion SL-d' of the comparative example may include a first cushion layer CS-1 disposed under or below the first support plate SP-1 and a second cushion layer CS-2 disposed under or below the second support plate SP-2. The first and second cushion layers CS-1 and CS-2 include adhesive portions AD-H1 and AD-H2 respectively filled in holes HA1 and HA2.

Table 1 below shows the deformation degree and the curvature value of the comparative example and embodiment examples 1 to 3. As described above with reference to FIG. 8, the expression "deformation degree" means the difference in height between the highest point that is convex upward and the lowest point that is convex downward graphs shown in FIG. 8. The expression "curvature" is a value obtained by measuring a bending degree of the highest point of the portion that is convex upward.

The comparative example corresponds to the display device including the cover member shown in FIG. 13, and embodiment examples 1 to 3 correspond to the display device including the cover member shown in FIG. 11B.

As common experimental conditions of the comparative example and embodiment examples 1 to 3, the thickness of the support plates SP-1 and SP-2 may be about 150 μm and the shortest distance DH between the adhesive portions AD-H1 and AD-H2 disposed under or below the support plates SP-1 and SP-2 may be about 30 mm. The adhesive layers AD5, AD6, AD7, and AD8 of the comparative example and embodiment examples 1 to 3 may be the pressure sensitive adhesive. The fifth adhesive layer AD5 disposed on the barrier layer BRL may have a thickness of about 25 μm.

The sixth adhesive layer AD6 of embodiment examples 1 to 3 has a thickness of about 10 μm. The foam coating layers FC-1 and FC-2 disposed directly on the support plates SP-1 and SP-2 have a thickness of about 30 μm.

The barrier layers BRL of embodiment examples 1 to 3 have different thicknesses and include different materials from each other. The barrier layer BRL of embodiment example 1 is an ultra-thin glass and has the thickness of about 30 μm. The barrier layer BRL of embodiment example 2 is a nano-stainless steel and has the thickness of about 22 μm. The barrier layer BRL of embodiment example 3 is a stainless steel and has the thickness of about 10 μm.

Different from embodiment examples 1 to 3, in the cover member CV-d' of the comparative example, the eighth adhesive layer AD8 is disposed on the support plates SP-1 and SP-2, and the cushion layer CS is disposed on the eighth adhesive layer AD8. The eighth adhesive layer AD8 has the thickness of about 10 μm, and the cushion layer CS has the thickness of about 100 μm. There may be a difference in thickness of the seventh adhesive layer AD7 that attaches the barrier layer BRL to the support portion SL-d'. The seventh adhesive layer AD7 has the thickness of about 25 μm. The barrier layer BRL of the comparative example is the ultra-thin glass and has the thickness of about 30 μm.

TABLE 1

|  | Comparative example | Embodiment example 1 | Embodiment example 2 | Embodiment example 3 |
| --- | --- | --- | --- | --- |
| Deformation degree (μm) | 12.7 | 5.1 | 5.1 | 6.5 |
| Curvature (K) | 2.7 | 1.1 | 4.8 | 3.6 |

In a case that the deformation degree is relatively large, the deformation in the folding area may be easily viewed from the outside. Referring to Table 1, the deformation degree of the comparative example may be about 12.7 μm that is relatively greater than the deformation degree of embodiment examples 1 to 3, which may be about 5.1 μm or about 6.5 μm.

This is because of the foam coating layers FC-1 and FC-2 that may be disposed directly on the support plates SP-1 and SP-2 of embodiment examples 1 to 3. The foam coating layers FC-1 and FC-2 improve the impact resistance as the cushion layer CS of comparative example does, however, the foam coating layers FC-1 and FC-2 may be directly coated on the support plates SP-1 and SP-2 and have a relatively thin thickness than the cushion layer CS of comparative example. Thus, in embodiment examples, the deformation degree in the folding area FA may be smaller or less than that of comparative example.

For example, the foam coating layers FC-1 and FC-2 of embodiment examples 1 to 3 may be disposed directly on the support plates SP-1 and SP-2 spaced apart from each other, and thus, the foam coating layers FC-1 and FC-2 of embodiment examples 1 to 3 may be spaced apart from each other in the folding area FA. Accordingly, the portions of the foam coating layers FC-1 and FC-2, which may overlap the folding area FA, may not be affected by the tensile force due to the folding operation. Accordingly, the degree to which the foam coating layers FC-1 and FC-2 exert an influence on the deformation degree of the cover member CV-d2 may be smaller or less than the degree to which the cushion layer CS of the comparative example exerts an influence on the cover member CV-d'.

In embodiment examples 1 to 3, the structure in which the deformation occurs during the folding operation is the barrier portion BR. In the comparative example, the structure in which the deformation occurs during the folding operation is the barrier portion BR', the cushion layer CS, and the adhesive layer AD8. Accordingly, when comparing the thickness of the structure in which the deformation occurs during the folding operation in embodiment examples 1 to 3 with that of the comparative example, the thickness of embodiment examples 1 to 3 may be smaller or less than that of the comparative example, and thus, the deformation degree in the folding area is reduced in embodiment examples 1 to 3.

When compared with embodiment examples 1 to 3, the cushion layer CS is not directly disposed on the support plates SP-1 and SP-2 and the adhesive layer AD8 is further interposed therebetween in comparative example. In embodiment examples 1 to 3 in which the foam coating layers FC-1 and FC-2 may be disposed directly on the support plates SP-1 and SP-2, the adhesive layer is not disposed between the support plates SP-1 and SP-2 and the foam coating layers FC-1 and FC-2, and a lamination process to attach the component to the adhesive layer may be omitted.

The curvature obtained by measuring the bending degree of the highest point that is convex upward shows how much flexural deformation occurs in the folding area. Accordingly, in a case that the curvature value is relatively large, the flexural deformation may be easily viewed from the outside. According to the comparative example and embodiment examples 1 to 3, the curvature value may vary depending on the material and thickness of the barrier layer BRL and the structure under or below the barrier layer BRL. The curvature value of the comparative example and embodiment examples 1 to 3 may be relatively small from about 1.1 to about 4.8. Accordingly, as the barrier layer BRL including the elastic material is disposed under or below the display module DM, it may be advantageous to restore the deformation, and the deformation degree becomes gentle.

The display device according to an embodiment may include the barrier layer disposed under or below the display module and including the elastic material, and the foam coating layer including the base portion disposed directly on the support plate and the foaming agent distributed in the base portion. Due to the barrier layer that may be advantageous to restore the deformation and the foam coating layer having the predetermined elastic force and strengthening the impact resistance, the deformation degree of the bending portion after the display device is folded or foldable may be improved.

The display device according to an embodiment may include the foam coating layers disposed directly on the support plates, which may be spaced apart from each other, to be spaced apart from each other. As the foam coating layers may be spaced apart from each other, the foam coating layers may not be affected by the external force in a case that the display device is folded or foldable. Thus, the foam coating layers may improve the impact resistance of the display device without significantly changing the flexural deformation degree of the display device.

Although embodiments have been described, it is understood that the disclosure should not be limited to these embodiments but various changes and modifications can be made by one of ordinary skill in the art within the spirit and scope of the disclosure as hereinafter claimed.

Therefore, the disclosed subject matter should not be limited to any single embodiment described herein, and the scope of the disclosure shall be determined according to the attached claims.

What is claimed is:

1. A display device, comprising:
    a display module comprising a portion disposed in a first non-folding area, a portion disposed in a second non-folding area, and a portion disposed in a folding area between the first and second non-folding areas;
    support plate disposed below the display module, the support plate consisting of any of stainless steel, aluminum, or an alloy thereof;
    a foam coating layer disposed directly on the support plate between the display module and the support plate in the first non-folding area, the second non-folding area, and the folding area, the foam coating layer comprising a base portion and a foaming agent included in the base portion; and
    a barrier layer disposed between the display module and the foam coating layer and comprising an elastic material.

2. The display device of claim 1, wherein the foaming agent of the foam coating layer has a substantially spherical shape and comprises a shell portion and a core portion.

3. The display device of claim 2, wherein the shell portion of the foaming agent of the foam coating layer comprises a thermoplastic resin.

4. The display device of claim 1, wherein the foaming agent has a weight equal to or greater than about 3 wt % and equal to or less than about 15 wt % of a total weight of the base portion.

5. The display device of claim 1, wherein the base portion of the foam coating layer comprises a polymer resin having a weight-average molecular weight equal to or greater than about 1000 and equal to or less than about 15000.

6. The display device of claim 1, wherein the foam coating layer has a Young's modulus equal to or greater than about 1 MPa and equal to or less than about 100 MPa at room temperature.

7. The display device of claim 1, wherein the foam coating layer has a density equal to or greater than about 0.3 g/cm and equal to or less than about 0.7 g/cm$^3$.

8. The display device of claim 1, wherein the barrier layer has a yield strain equal to or greater than about 1.0% and equal to or less than about 2.5%.

9. The display device of claim 1, wherein the barrier layer comprises an ultra-thin glass, a glass fiber, or a stainless steel.

10. The display device of claim 1, wherein the barrier layer has a Young's modulus equal to or greater than about 2 GPa and equal to or less than about 200 GPa at room temperature.

11. A display device, comprising:
    a display module comprising:
    a folding area foldable with respect to a folding axis extending in a first direction;
    a first non-folding area adjacent to a side of the folding area; and
    a second non-folding area adjacent to another side of the folding area;
    a barrier layer disposed below the display module and comprising an elastic material;
    a first support plate disposed below the first non-folding area;

a second support plate disposed below the second non-folding area and spaced apart from the first support plate in a second direction substantially perpendicular to the first direction;
a first foam coating layer disposed between the first support plate and the first non-folding area of the display module; and
a second foam coating layer disposed between the second support plate and the second non-folding area of display module, the second foam coating layer being spaced apart from the first foam coating layer in the second direction, wherein
each of the first foam coating layer and the second foam coating layer comprises a plurality of sub-coating layers, and
the first foam coating layer comprises:
a first sub-coating layer disposed on the first support plate; and
a second sub-coating layer disposed on the first sub-coating layer,
the second foam coating layer comprises:
a third sub-coating layer disposed on the second support plate; and
a fourth sub-coating layer disposed on the third sub-coating layer, and
a minimum separation distance between the first sub-coating layer and the third sub-coating layer adjacent to the first sub-coating layer is less than a minimum separation distance between the second sub-coating layer and the fourth sub-coating layer adjacent to the second sub-coating layer.

12. The display device of claim 11, wherein each of the first foam coating layer and the second foam coating layer comprises a base portion and a foaming agent included in the base portion with the foaming agent having a substantially spherical shape.

13. The display device of claim 11, wherein the barrier layer has a yield strain equal to or greater than about 1.0% and equal to or less than about 2.5%.

14. The display device of claim 11, wherein
a minimum separation distance (D3) between a line extending from an end of the first support plate overlapping the folding area and a line extending from an end of the second sub-coating coating layer satisfies the following:

$DP+RC \leq D3 \leq DP+3RC$, a minimum separation distance (D4) between a line extending from an end of the second support plate overlapping the folding area and a line extending from an end of the fourth sub-coating layer satisfies the following:

$DP+RC \leq D4 \leq DP+3RC$, wherein DP denotes a minimum separation distance between the first support plate and the second support plate, and RC denotes a radius of curvature of the folding area.

15. A display device, comprising:
a display module comprising:
a folding area foldable with respect to a folding axis extending in a first direction;
a first non-folding area adjacent to a side of the folding area; and
a second non-folding area adjacent to another side of the folding area;
a barrier layer disposed below the display module and comprising an elastic material;
a first support plate disposed below the first non-folding area;
a second support plate disposed below the second non-folding area and spaced apart from the first support plate in a second direction substantially perpendicular to the first direction;
a first foam coating layer disposed between the first support plate and the first non-folding area of the display module;
a second foam coating layer disposed between the second support plate and the second non-folding area of display module, the second foam coating layer being spaced apart from the first foam coating layer in the second direction;
a first cushion layer disposed below the first support plate and including a first hole; and
a second cushion layer disposed below the second support plate and including a second hole, wherein
each of the first hole of the first cushion layer and the second hole of the second cushion layer has an elongated form with a longest dimension of the elongated form being substantially parallel to the first direction.

16. The display device of claim 15, further comprising an adhesive portion filled in each of the first hole of the first cushion layer and the second hole of the second cushion layer.

17. The display device of claim 16, wherein the adhesive portion has a thickness less than a thickness of each of the first cushion layer and the second cushion layer.

18. The display device of claim 15, wherein a shortest distance between the first hole of the first cushion layer and the second hole of the second cushion layer in the second direction is equal to or greater than about 25 mm and equal to or less than about 35 mm.

* * * * *